(12) United States Patent
Benassi

(10) Patent No.: US 12,120,992 B2
(45) Date of Patent: *Oct. 22, 2024

(54) INTERNET OF THINGS (IOT)-BASED MICROWELL SOLUTION FOR IRRIGATION

(71) Applicant: CenturyLink Intellectual Property LLC, Broomfield, CO (US)

(72) Inventor: William Benassi, Elk River, MN (US)

(73) Assignee: CenturyLink Intellectual Property LLC, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/388,845

(22) Filed: Nov. 12, 2023

(65) Prior Publication Data

US 2024/0074368 A1 Mar. 7, 2024

Related U.S. Application Data

(63) Continuation of application No. 17/735,761, filed on May 3, 2022, now Pat. No. 11,812,705.

(60) Provisional application No. 63/217,848, filed on Jul. 2, 2021.

(51) Int. Cl.
*A01G 25/16* (2006.01)
*A01G 25/09* (2006.01)
*H04W 84/18* (2009.01)

(52) U.S. Cl.
CPC ......... *A01G 25/167* (2013.01); *A01G 25/092* (2013.01); *H04W 84/18* (2013.01)

(58) Field of Classification Search
CPC .... A01G 25/167; A01G 25/092; H04W 84/18
See application file for complete search history.

(56) References Cited

U.S. PATENT DOCUMENTS

| 4,452,227 A | 6/1984 | Lowrey | |
|---|---|---|---|
| 2005/0045228 A1* | 3/2005 | Labrador | ................. E03B 1/02 137/357 |
| 2009/0277506 A1* | 11/2009 | Bradbury | ............... A01G 25/16 137/1 |
| 2016/0057949 A1 | 3/2016 | William | |

(Continued)

FOREIGN PATENT DOCUMENTS

CN 212728038 3/2021

*Primary Examiner* — Chad G Erdman

(57) ABSTRACT

Novel tools and techniques are provided for implementing Internet of Things ("IoT")-based microwell solution for irrigation. In various embodiments, in response to receiving, from the plurality of sensors, first sensor data indicative of environmental conditions within an area, a computing system may analyze the first sensor data to determine parameters associated with water requirements within the area, may generate a water distribution plan based at least in part on the determined parameters, and may map the generated water distribution plan to a positional map of a plurality of microwells disposed at pre-installed locations within the area. The computing system may generate and send instructions to the microwells to pump water from an underground water source(s) (in some cases, surface water sources as well) and to irrigate plants or crops in the area using integrated irrigation systems, based on the mapping. The microwells and sensors may utilize IoT functionalities.

13 Claims, 8 Drawing Sheets

(56) References Cited

U.S. PATENT DOCUMENTS

2020/0024833 A1\* 1/2020 Azzouni ............ E21B 41/0057
2023/0000028 A1 1/2023 Benassi \* cited by examiner

INTERNET OF THINGS (IOT)-BASED MICROWELL SOLUTION FOR IRRIGATION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing Internet of Things ("IoT") functionality, and, more particularly, to methods, systems, and apparatuses for implementing IoT-based microwell solution for irrigation.

BACKGROUND

In conventional agricultural fields, watering of plants or crops requires either piping in water from a water utility or using a conventional well on the property. Both are expensive options. With regard to conventional wells, it is typically necessary to dig about 100 ft (or about 30 m) or deeper into the ground, which incurs great expense for installation of the well, as well as ongoing costs for maintenance and for taxes. Such conventional wells (or piping in of water from the water utility) also cannot take advantage of any surface water sources for irrigation purposes, as such conventional approaches are ill-equipped to utilize such either low-flow, low-volume, and/or shallow water sources without significant modification of the irrigation system being used in conjunction with these conventional approaches. Such systems also require additional irrigation infrastructure for coupling with the irrigation system to provide water directly to the plants or crops, conventional versions of such irrigation infrastructure being inefficient and typically indiscriminate in terms of watering, resulting in water waste, which translates to cost increases.

Hence, there is a need for more robust and scalable solutions for implementing Internet of Things ("IoT") functionality, and, more particularly, to methods, systems, and apparatuses for implementing IoT-based microwell solution for irrigation.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
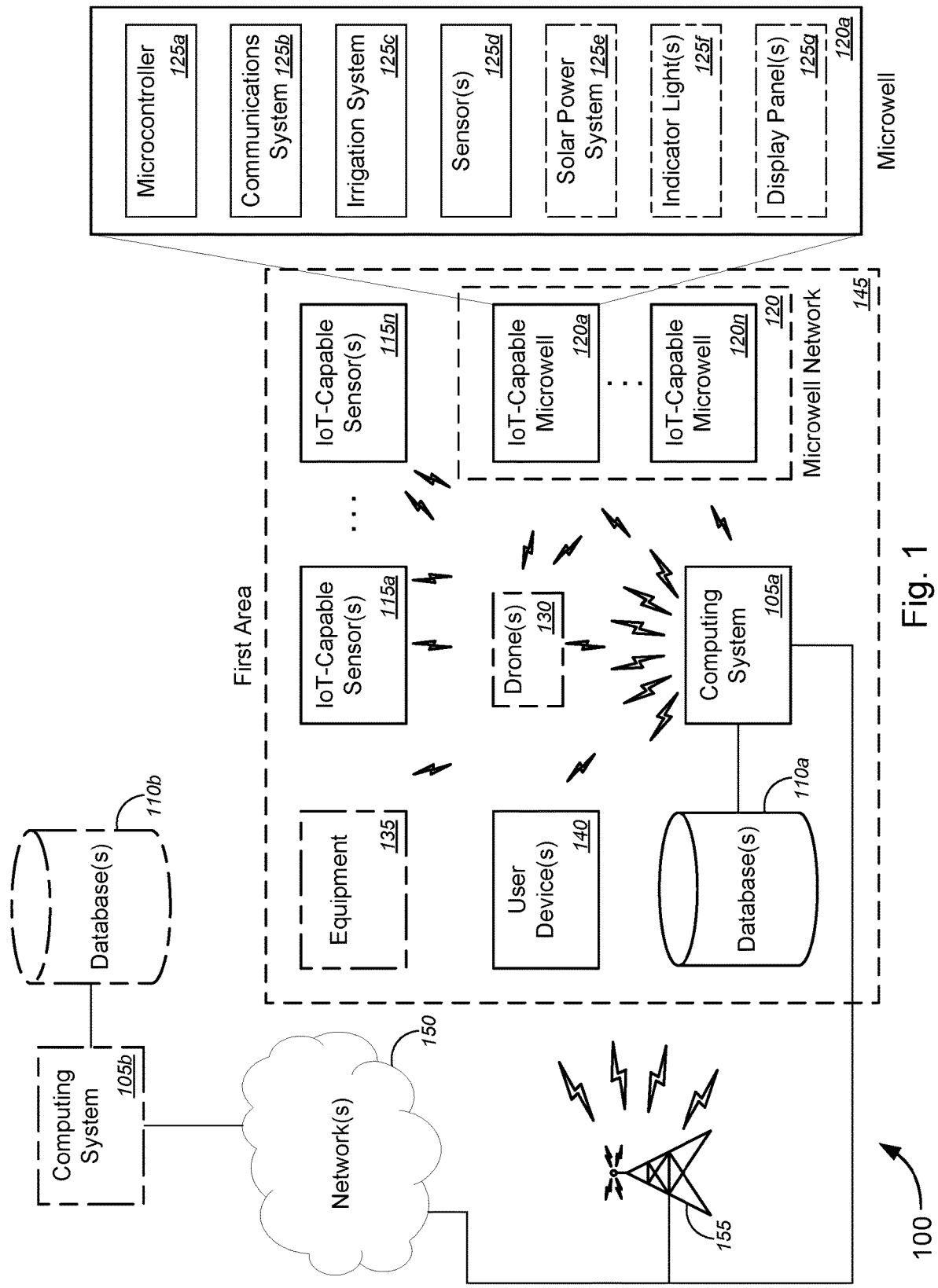
FIG. 1 is a schematic diagram illustrating a system for implementing Internet of Things ("IoT")-based microwell solution for irrigation, in accordance with various embodiments.

Various embodiments provide tools and techniques for implementing Internet of Things ("IoT") functionality, and, more particularly, to methods, systems, and apparatuses for implementing IoT-based microwell solution for irrigation.

In various embodiments, a computing system may receive, from a plurality of sensors, first sensor data, the first sensor data being indicative of environmental conditions within a first area; may analyze the first sensor data to determine one or more first parameters associated with water requirements within the first area; and may generate a first water distribution plan for the first area based at least in part on the determined one or more first parameters. In some embodiments, the first sensor data may include, without limitation, at least one of humidity sensor data, soil moisture sensor data, ground water sensor data, water flow sensor data, clog sensor data, water pump sensor data, irrigation system sensor data, temperature sensor data, wind sensor data, weather sensor data, slope sensor data, topography sensor data, light sensor data, light intensity sensor data, image sensor data, video sensor data, object orientation sensor data, surface orientation sensor data, plant monitoring sensor data, motion sensor data, infrared sensor data, or pest detector data, and/or the like. In some cases, the one or more first parameters associated with water requirements may include, but are not limited to, at least one of humidity level, soil moisture level, water table depth, water table slope, water flow amount, water run-off characteristics, water evaporation rate, temperature, wind speed, wind direction, weather conditions, slope, topography, sun intensity level, orientation of objects, orientation of surfaces, plant color, plant size, plant shape, plant growth indicators, plant wilting indicators, or presence of pests, and/or the like.

The computing system may map the generated first water distribution plan for the first area to a positional map of the plurality of microwells disposed in the corresponding plurality of pre-installed locations within the first area; may generate first command instructions for each microwell among the plurality of microwells to pump water from an underground water source and to irrigate a portion of the first area using the integrated irrigation system, based at least in part on the mapping of the generated first water distribution plan to the positional map of the plurality of microwells; and may send, via the transceiver, the generated first command instructions to each microwell among the plurality of microwells. In some instances, the first command instructions for each microwell may include, without limitation, instructions for at least one of direction of irrigation from said microwell, angle of water dispersion along the direction of irrigation, distance of irrigation from said microwell, amount of water to disperse from said microwell, rate of water dispersion from said microwell, or timing of irrigation for said microwell, and/or the like.

According to some embodiments, at least one microwell among the microwell network each may send sensor data, from the one or more first sensors and via the wireless communications system, to the computing system, which is configured to control the plurality of microwells within the first area; may receive, from the computing system, the first command instructions; and may, in response to receiving the first command instructions, pump water from an underground water source using the pump and to actuate the integrated irrigation system to irrigate a portion of the first area around said microwell based on the first command instructions.

In some embodiments, the computing system may receive, from one or more second sensors, second sensor data, the second sensor data being indicative of environmental conditions within the first area prior to installation of the plurality of microwells within the first area; may analyze the second sensor data to determine one or more second parameters associated with water requirements within the first area; and may generate a second water distribution plan for the first area based at least in part on the determined one or more second parameters. The computing system may map the generated second water distribution plan for the first area to a geographical map of the first area; and may analyze the mapping of the generated second water distribution plan to the geographical map of the first area to determine placement of each of the plurality of microwells within the first area, wherein the determined placement corresponds to the plurality of pre-installed locations of the plurality of microwells. The computing system may generate the positional map of the plurality of microwells within the first area based on the determined placement of each of the plurality of microwells within the first area; and may send the generated positional map of the plurality of microwells within the first area to at least one of a user device associated with a user or a navigation system of a device configured to install each microwell within the first area.

According to some embodiments, the one or more second sensors may include a percolation test sensor, which may be used to measure a rate at which water percolates through a portion of soil in each of one or more locations throughout the first area. In some cases, the plurality of sensors may comprise at least one second sensor among the one or more second sensors, where the at least one second sensor comprises a third sensor, which may be disposed in an aerial drone that is configured to fly over the first area to collect sensor data indicative of at least one of environmental conditions, topographical features, geographical features, plantable areas, water features, land features, plant-life, or wildlife within the first area, and/or the like.

The use of the microwells or microwell network as described herein allows for tapping of surface water sources or relatively shallow underground water sources (e.g., less than 50 feet or about 15.2 m) for providing irrigation to an agriculture, commercial, or residential field/lawn, compared with traditional wells that require 100 foot deep installations or deeper. Accordingly, the costs of installation and operation (including applicable taxes) is much lower for the microwell or microwell network implementation. Further, the features of the microwells enable more efficient use and direction of water that takes into account current or up-to-date conditions (and thus water needs of particular plants or crops) to direct the correct amount of water (along with insecticide, fertilizer, and/or growth enhancers) to particular plants (or portions of plants) or crops, thereby minimizing waste while enhancing growth potential of the plants or crops. Maintenance of the microwell network may also be facilitated with use of remotely controlled valves and pumps for controlling flow and pressure of water and air through the system, or the like. These features are facilitated by use of IoT communications that automate the system, thereby reducing potential human error while enabling more control (and less physical labor) by human users or operators.

These and other aspects of the IoT-based microwell solution for irrigation are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, well installation technology, well operation technology, well water technology, irrigation technology, and/or farming or gardening technology, and/or the like. In other aspects, certain embodiments, can improve the functioning of user equipment or systems themselves (e.g., well installation systems, well operation systems, well water systems, irrigation systems, and/or farming or gardening systems, etc.), for example, by receiving, using a computing system and from a plurality of sensors, first sensor data, the first sensor data being indicative of environmental conditions within a first area; analyzing, using the computing system, the first sensor data to determine one or more first parameters associated with water requirements within the first area; generating, using the computing system, a first water distribution plan for the first area based at least in part on the determined one or more first parameters; mapping, using the computing system, the generated first water distribution plan for the first area to a positional map of a plurality of microwells disposed in a corresponding plurality of pre-installed locations within the first area, each microwell comprising a pump, an integrated irrigation system, and a wireless communications system for communicating with the computing system via a transceiver; generating, using the computing system, first command instructions for each microwell among the plurality of microwells to pump water from an underground water source and to irrigate a portion of the first area using the integrated irrigation system, based at least in part on the mapping of the generated first water distribution plan to the positional map of the plurality of microwells, the first command instructions for each microwell comprising instructions for at least one of direction of irrigation from said microwell, angle of water dispersion along the direction of irrigation, distance of irrigation from said microwell, amount of water to disperse from said microwell, rate of water dispersion from said microwell, or timing of irrigation for said microwell; and sending, using the computing system via the transceiver, the generated first command instructions to each microwell among the plurality of microwells; and/or the like.

In particular, to the extent any abstract concepts are present in the various embodiments, those concepts can be implemented as described herein by devices, software, systems, and methods that involve specific novel functionality (e.g., steps or operations), such as, utilizing microwells or a microwell network that is installed based on analysis of sensor data and other data to optimize placement of each microwell at optimal depths, that is configured to draw underground water that is at depths much shallower using holes much narrower compared to conventional wells, that incorporates pumping and sprinkler (and/or drip) functionalities, that is configured to draw water from surface water sources, that is configured to move (via pipes, valves, and pumps) water from one microwell to other microwells in the network, and that utilizes IoT functionalities to control the components of the microwell network, and/or the like, to name a few examples, that extend beyond mere conventional computer processing operations. These functionalities can produce tangible results outside of the implementing computer system, including, merely by way of example, optimized installation of wells (in this case, microwells), optimized placement of wells (in this case, microwells), optimized drawing of water from throughout the field at depths much shallower using holes much narrower than expensive conventional wells, optimized irrigation of plants or crops in the field, and optimized control (using IoT) of the microwell network, and/or the like, at least some of which may be observed or measured by users, landowners, operators, and/or service providers.

In an aspect, a method may comprise receiving, using a computing system and from a plurality of sensors, first sensor data, the first sensor data being indicative of environmental conditions within a first area; analyzing, using the computing system, the first sensor data to determine one or more first parameters associated with water requirements within the first area; generating, using the computing system, a first water distribution plan for the first area based at least in part on the determined one or more first parameters; and mapping, using the computing system, the generated first water distribution plan for the first area to a positional map of a plurality of microwells disposed in a corresponding plurality of pre-installed locations within the first area, each microwell comprising a pump, an integrated irrigation system, and a wireless communications system for communicating with the computing system via a transceiver. The method may further comprise generating, using the computing system, first command instructions for each microwell among the plurality of microwells to pump water from an underground water source and to irrigate a portion of the first area using the integrated irrigation system, based at least in part on the mapping of the generated first water distribution plan to the positional map of the plurality of microwells, the first command instructions for each microwell comprising instructions for at least one of direction of irrigation from said microwell, angle of water dispersion along the direction of irrigation, distance of irrigation from said microwell, amount of water to disperse from said microwell, rate of water dispersion from said microwell, or timing of irrigation for said microwell, and/or the like; and sending, using the computing system via the transceiver, the generated first command instructions to each microwell among the plurality of microwells.

In some embodiments, the computing system may comprise at least one of a farm management computing system, a crop management computing system, a lawn management computing system, an irrigation control system, a microwell control system, a server computer, a cloud computing system, or a distributed computing system, and/or the like. In some cases, the first sensor data may comprise at least one of humidity sensor data, soil moisture sensor data, ground water sensor data, water flow sensor data, clog sensor data, water pump sensor data, irrigation system sensor data, temperature sensor data, wind sensor data, weather sensor data, slope sensor data, topography sensor data, light sensor data, light intensity sensor data, image sensor data, video sensor data, object orientation sensor data, surface orientation sensor data, plant monitoring sensor data, motion sensor data, infrared sensor data, or pest detector data, and/or the like. In some instances, the first area may comprise at least one of an agricultural field, a farm, a plot of land, a crop field, a sod farm, a residential lawn, a commercial lawn, a residential garden, or a commercial garden, and/or the like. In some cases, the one or more first parameters associated with water requirements may comprise at least one of humidity level, soil moisture level, water table depth, water table slope, water flow amount, water run-off characteristics, water evaporation rate, temperature, wind speed, wind direction, weather conditions, slope, topography, sun intensity level, orientation of objects, orientation of surfaces, plant color, plant size, plant shape, plant growth indicators, plant wilting indicators, or presence of pests, and/or the like.

According to some embodiments, each microwell may further comprise: an auger disposed at a distal end of said microwell, the auger being configured to be inserted into the ground; a well cap disposed at a midpoint of said microwell, the well cap being configured to be positioned at ground level; a hollow shaft disposed between the auger and the well cap, with a distal end of the hollow shaft being connected to the auger and a proximal end of the hollow shaft being connected to the well cap; at least one opening along at least a portion of the distal end of the hollow shaft near the auger, the pump being either disposed within the hollow shaft or disposed within the well cap, and at least a first portion of the integrated irrigation system being either disposed within the well cap or fluidly coupled with the hollow shaft via the well cap; a particulate screen disposed over each opening of the at least one opening; a container disposed at a proximal end of said microwell, wherein the container is configured to house a microcontroller, the wireless communications system, at least a second portion of the integrated irrigation system, and one or more first sensors among the plurality of sensors; and a post disposed between the well cap and the container, the post configured to elevate the container above ground level.

Alternatively, or additionally, each microwell may further comprise at least one of: a solar power system disposed in the container, the solar power system comprising one or more solar panels and one or more batteries; at least one of an array of indicator lights or a display panel disposed on a surface of the container; or at least one of an array of speakers disposed on the surface of the container; and/or the like.

In some embodiments, the integrated irrigation system may comprise at least one of a sprinkler-type irrigation system disposed within the at least a second portion of the integrated irrigation system or a drip-type irrigation system disposed within the at least a first portion of the integrated irrigation system, and/or the like. In some cases, the sprinkler-type irrigation system may comprise one of a rotary sprinkler, a stationary sprinkler, an impact sprinkler, a jet sprinkler, or a micro-sprinkler, and/or the like, while the drip-type irrigation system may comprise at least one of one or more drip hoses with point-source emitters, one or more drip hoses with patterned emitters, one or more drip hoses with spray jet emitters, one or more drip hoses with micro sprinkler emitters, one or more inline drip emitter hoses, one or more porous soaker hoses, or one or more drip tapes, and/or the like. In some instances, the hollow shaft and the post may form one unitary hollow structure that comprises one or more ports configured to interface with the well cap at ground level, where the pump may be disposed at one of within the hollow shaft, within the well cap, within the container, or within the at least a second portion of the integrated irrigation system, and/or the like.

According to some embodiments, at least one microwell may be fluidly coupled to an adjacent microwell among the plurality of microwells via a fluid pipe and via fluid connections between the well cap of one fluidly coupled microwell and the well cap of another fluidly coupled microwell to form a network of connected microwells. In some instances, the fluid pipe may be configured to transport first fluids between the fluidly coupled microwells using at least one transport pump disposed at one or more fluidly coupled microwells. In some cases, the first fluids may comprise at least one of water, fertilizer in a fluid medium, plant growth enhancers in a fluid medium, or insecticide in a fluid medium, and/or the like. In some instances, the network of connected microwells may fluidly couple with a combination of one or more underground water sources and one or more surface water sources, wherein the network of connected microwells may be fluidly coupled with each underground water source via one of the plurality of microwells, wherein the network of connected microwells may be fluidly coupled with each surface water source via at least one surface water pump in fluid communication with each surface water source and via a corresponding fluid pipe in fluid communication with at least one microwell in the network of connected microwells.

Merely by way of example, in some cases, the method may further comprise: receiving, using the computing system and from one or more second sensors, second sensor data, the second sensor data being indicative of environmental conditions within the first area prior to installation of the plurality of microwells within the first area; analyzing, using the computing system, the second sensor data to determine one or more second parameters associated with water requirements within the first area; generating, using the computing system, a second water distribution plan for the first area based at least in part on the determined one or more second parameters; mapping, using the computing system, the generated second water distribution plan for the first area to a geographical map of the first area; analyzing, using the computing system, the mapping of the generated second water distribution plan to the geographical map of the first area to determine placement of each of the plurality of microwells within the first area, wherein the determined placement corresponds to the plurality of pre-installed locations of the plurality of microwells; generating, using the computing system, the positional map of the plurality of microwells within the first area based on the determined placement of each of the plurality of microwells within the first area; and sending, using the computing system, the generated positional map of the plurality of microwells within the first area to at least one of a user device associated with a user or a navigation system of a device configured to install each microwell within the first area.

In some embodiments, the one or more second sensors may comprise a percolation test sensor, wherein the percolation test sensor may be used to measure a rate at which water percolates through a portion of soil in each of one or more locations throughout the first area. In some instances, the plurality of sensors may comprise at least one second sensor among the one or more second sensors, wherein the at least one second sensor may comprise a third sensor, wherein the third sensor may be disposed in an aerial drone that is configured to fly over the first area to collect sensor data indicative of at least one of environmental conditions, topographical features, geographical features, plantable areas, water features, land features, plant-life, or wildlife, and/or the like, within the first area. In some cases, the computing system may autonomously communicate with each microwell among the plurality of microwells and with each of the plurality of sensors using Internet of Things ("IoT")-based communications protocols.

In another aspect, a system might comprise a plurality of sensors; a plurality of microwells disposed in a corresponding plurality of pre-installed locations within a first area; and a computing system. Each microwell may comprise a pump, an integrated irrigation system, and a wireless communications system for communicating with the computing system via a transceiver. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from the plurality of sensors, first sensor data, the first sensor data being indicative of environmental conditions within the first area; analyze the first sensor data to determine one or more first parameters associated with water requirements within the first area; generate a first water distribution plan for the first area based at least in part on the determined one or more first parameters; map the generated first water distribution plan for the first area to a positional map of the plurality of microwells disposed in the corresponding plurality of pre-installed locations within the first area; generate first command instructions for each microwell among the plurality of microwells to pump water from an underground water source and to irrigate a portion of the first area using the integrated irrigation system, based at least in part on the mapping of the generated first water distribution plan to the positional map of the plurality of microwells, the first command instructions for each microwell comprising instructions for at least one of direction of irrigation from said microwell, angle of water dispersion along the direction of irrigation, distance of irrigation from said microwell, amount of water to disperse from said microwell, rate of water dispersion from said microwell, or timing of irrigation for said microwell; and send, via the transceiver, the generated first command instructions to each microwell among the plurality of microwells.

In some embodiments, the computing system may comprise at least one of a farm management computing system, a crop management computing system, a lawn management computing system, an irrigation control system, a microwell control system, a server computer, a cloud computing system, or a distributed computing system, and/or the like. According to some embodiments, the computing system may autonomously communicate with each microwell among the plurality of microwells and with each of the plurality of sensors using Internet of Things ("IoT")-based communications protocols.

In yet another aspect, a microwell among a plurality of microwells may be provided, the plurality of microwells being configured to be installed within a first area. The microwell may comprise: a distal end; a proximal end; a midpoint between the distal end and the proximal end; an auger disposed at the distal end, the auger being configured to be inserted into the ground; a well cap disposed at the midpoint, the well cap being configured to be positioned at ground level; a hollow shaft disposed between the auger and the well cap, with a distal end of the hollow shaft being connected to the auger and a proximal end of the hollow shaft being connected to the well cap; at least one opening along at least a portion of the distal end of the hollow shaft near the auger; a particulate screen disposed over each opening of the at least one opening; a container disposed at the proximal end; a post disposed between the well cap and the container, the post configured to elevate the container above ground level; a pump, the pump being either disposed within the hollow shaft or disposed within the well cap; an integrated irrigation system, at least a first portion of the integrated irrigation system being either disposed within the well cap or fluidly coupled with the hollow shaft via the well cap; a wireless communications system; one or more first sensors among a plurality of sensors; and a microcontroller, wherein the container is configured to house the microcontroller, the wireless communications system, at least a second portion of the integrated irrigation system, and the one or more first sensors.

The microcontroller may comprise at least one first processor and a first non-transitory computer readable medium communicatively coupled to the at least one first processor. The first non-transitory computer readable medium might have stored thereon computer software comprising a first set of instructions that, when executed by the at least one first processor, causes the microcontroller to: send sensor data, from the one or more first sensors and via the wireless communications system, to a computing system configured to control the plurality of microwells within the first area; receive, from the computing system, first command instructions, the first command instructions comprising instructions for at least one of direction of irrigation, angle of water dispersion along the direction of irrigation, distance of irrigation, amount of water to disperse, rate of water dispersion, or timing of irrigation; and in response to receiving the first command instructions, pump water from an underground water source using the pump and to actuate the integrated irrigation system to irrigate a portion of the first area around said microwell based on the first command instructions.

According to some embodiments, the microwell may further comprise at least one of: a solar power system disposed in the container, the solar power system comprising one or more solar panels and one or more batteries; at least one of an array of indicator lights or a display panel disposed on a surface of the container; or at least one of an array of speakers disposed on the surface of the container; and/or the like.

Merely by way of example, in some cases, the integrated irrigation system may comprise at least one of a sprinkler-type irrigation system disposed within the at least a second portion of the integrated irrigation system or a drip-type irrigation system disposed within the at least a first portion of the integrated irrigation system. In some instances, the sprinkler-type irrigation system may comprise one of a rotary sprinkler, a stationary sprinkler, an impact sprinkler, a jet sprinkler, or a micro-sprinkler, and/or the like. In some cases, the drip-type irrigation system may comprise at least one of one or more drip hoses with point-source emitters, one or more drip hoses with patterned emitters, one or more drip hoses with spray jet emitters, one or more drip hoses with micro sprinkler emitters, one or more inline drip emitter hoses, one or more porous soaker hoses, or one or more drip tapes, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing Internet of Things ("IoT") functionality, and, more particularly, to methods, systems, and apparatuses for implementing IoT-based microwell solution for irrigation, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing Internet of Things ("IoT")-based microwell solution for irrigation, in accordance with various embodiments.

In the non-limiting embodiment of FIG. 1, system 100 might comprise a computing system 105a and a data store or database 110a that is local to the computing system 105a. In some cases, the database 110a might be external, yet communicatively coupled, to the computing system 105a. In other cases, the database 110a might be integrated within the computing system 105a. System 100, according to some embodiments, might further comprise Internet of Things ("IoT")-capable sensors 115a-115n (collectively, "IoT-capable sensors 115" or the like) and one or more IoT-capable microwells 120a-120n (collectively, "IoT-capable microwells 120" or "microwell network 120," or the like). In some instances, each microwell 120 may include, without limitation, a microcontroller 125a, communications system 125b, irrigation system 125c, and one or more sensors 125d. In some cases, each microwell 120 may additionally include, but is not limited to, at least one of a solar power system 125e, one or more indicator lights 125f, or one or more display panels 125g, and/or the like. The solar power system 125e may include, without limitation, one or more solar panels and one or more batteries.

According to some embodiments, system 100 might further comprise one or more drones 130, equipment 135, and one or more user devices 140. In some cases, the computing system 105a and corresponding database(s) 110a, the one or more IoT-capable sensors 115, the one or more IoT-capable microwells or microwell network 120, the one or more drones 130, the equipment 135, and the one or more user devices 140 may be disposed within a first area, including, but not limited to, at least one of an agricultural field, a farm, a plot of land, a crop field, a sod farm, a residential lawn, a commercial lawn, a residential garden, or a commercial garden, and/or the like. System 100 may further comprise remote computing system 105b and corresponding database(s) 110b that communicatively couple with at least one of computing system 105a, IoT-capable sensors 115, IoT-capable microwells or microwell network 120, drone(s) 130, equipment 135, or user device(s) 140, and/or the like, via network(s) 150 (and in some cases, via the one or more telecommunications relay systems 155, either via wireless communications or via a combination of wireless and wired communications). In some cases, computing system 105a may wireless communicate with each of the at least one of IoT-capable sensors 115, IoT-capable microwells or microwell network 120, drone(s) 130, equipment 135, or user device(s) 140, and/or the like (as depicted in FIG. 1 by lightning bolt symbols). Merely by way of example, in some cases, the computing system 105a may autonomously communicate with each microwell among the plurality of microwells and with each of the plurality of sensors 115a-115n and/or 125d using Internet of Things ("IoT")-based communications protocols and/or network protocols, or the like, including, but not limited to, at least one of Wi-Fi®, Bluetooth™ ZigBee®, Z-Wave®, LoRaWan®, IEEE 802.11ah, IEEE 802.15.4e, etc.

In some embodiments, the computing system 105a may include, without limitation, at least one of a farm management computing system, a crop management computing system, a lawn management computing system, an irrigation control system, or a microwell control system, and/or the like. In some cases, the remote computing system 105b may include, without limitation, at least one of a server computer, a cloud computing system, or a distributed computing system, and/or the like. In some cases, the IoT-capable sensors 115 and/or the sensors 125d may each include, but is not limited to, at least one of one or more humidity sensors, one or more soil moisture sensors, one or more ground water sensors, one or more water flow sensors, one or more clog sensors, one or more water pump sensors, one or more irrigation system sensors, one or more temperature sensors, one or more wind sensors, one or more weather sensors, one or more slope sensors, one or more topography sensors, one or more light sensors, one or more light intensity sensors, one or more image sensors, one or more video sensors, one or more object orientation sensors, one or more surface orientation sensors, one or more plant monitoring sensors, one or more motion sensors, one or more infrared sensors, or one or more pest detectors, and/or the like.

According to some embodiments, each microwell may include, without limitation, a pump, an integrated irrigation system, and a wireless communications system for communicating with the computing system via a transceiver. In some instances, each microwell may further include, without limitation, an auger disposed at a distal end of said microwell, the auger being configured to be inserted into the ground; a well cap disposed at a midpoint of said microwell, the well cap being configured to be positioned at ground level; a hollow shaft disposed between the auger and the well cap, with a distal end of the hollow shaft being connected to the auger and a proximal end of the hollow shaft being connected to the well cap; at least one opening along at least a portion of the distal end of the hollow shaft near the auger, the pump being either disposed within the hollow shaft or disposed within the well cap, and at least a first portion of the integrated irrigation system being either disposed within the well cap or fluidly coupled with the hollow shaft via the well cap; a particulate screen disposed over each opening of the at least one opening; a container disposed at a proximal end of said microwell, wherein the container is configured to house a microcontroller, the wireless communications system, at least a second portion of the integrated irrigation system, and one or more first sensors among the plurality of sensors; and a post disposed between the well cap and the container, the post configured to elevate the container above ground level; and/or the like. In some cases, each microwell may further include, without limitation, at least one of: a solar power system disposed in the container, the solar power system comprising one or more solar panels and one or more batteries; or at least one of an array of indicator lights or a display panel disposed on a surface of the container; and/or the like.

In some embodiments, the integrated irrigation system may include, but is not limited to, at least one of a sprinkler-type irrigation system disposed within the at least a second portion of the integrated irrigation system or a drip-type irrigation system disposed within the at least a first portion of the integrated irrigation system. In some cases, the sprinkler-type irrigation system may include, without limitation, one of a rotary sprinkler, a stationary sprinkler, an impact sprinkler, a jet sprinkler, or a micro-sprinkler, and/or the like. In some instances, the drip-type irrigation system may include, but is not limited to, at least one of one or more drip hoses with point-source emitters, one or more drip hoses with patterned emitters, one or more drip hoses with spray jet emitters, one or more drip hoses with micro sprinkler emitters, one or more inline drip emitter hoses, one or more porous soaker hoses, or one or more drip tapes, and/or the like. Alternatively, or additionally, the hollow shaft and the post may form one unitary hollow structure that comprises one or more ports configured to interface with the well cap at ground level, where the pump is disposed at one of (i) within the hollow shaft, (ii) within the well cap, (iii) within the container, or (iv) within the at least a second portion of the integrated irrigation system, and/or the like.

Merely by way of example, in some cases, at least one microwell may be fluidly coupled to an adjacent microwell among the plurality of microwells via a fluid pipe and via fluid connections between the well cap of one fluidly coupled microwell and the well cap of another fluidly coupled microwell to form a network of connected microwells. In some cases, the fluid pipe may be configured to transport first fluids between the fluidly coupled microwells using at least one transport pump disposed at one or more fluidly coupled microwells. In some instances, the first fluids may include, but are not limited to, at least one of water, fertilizer in a fluid medium, plant growth enhancers in a fluid medium, or insecticide in a fluid medium, and/or the like. According to some embodiments, the network of connected microwells may fluidly couple with a combination of one or more underground water sources and one or more surface water sources. In some cases, the network of connected microwells may be fluidly coupled with each underground water source via one of the plurality of microwells. In some instances, the network of connected microwells may be fluidly coupled with each surface water source via at least one surface water pump in fluid communication with each surface water source and via a corresponding fluid pipe in fluid communication with at least one microwell in the network of connected microwells.

In some instances, equipment 135 may include, without limitation, at least one of farm equipment (e.g., cutters, mowers, and/or shredders; harvesting equipment; hay equipment; forage equipment; planting equipment; seeding equipment; tillage equipment; etc.), garden equipment, etc. In some cases, the one or more user devices 140 may include, but are not limited to, at least one of a desktop computer, a laptop computer, a tablet computer, a smart phone, a mobile phone, a personal digital assistant, or a remote system control device, and/or the like.

According to some embodiments, network(s) 150 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 150 may include an access network of the service provider (e.g., an Internet service provider ("ISP")). In another embodiment, the network(s) 150 may include a core network of the service provider and/or the Internet.

In operation, computing system 105a and/or 105b (collectively, "computing system" or the like) may receive, from the plurality of sensors (e.g., sensors 115a-115n and/or 125d, etc.), first sensor data, the first sensor data being indicative of environmental conditions within the first area (e.g., first area 145, etc.); may analyze the first sensor data to determine one or more first parameters associated with water requirements within the first area; and may generate a first water distribution plan for the first area based at least in part on the determined one or more first parameters. In some embodiments, the first sensor data may include, without limitation, at least one of humidity sensor data, soil moisture sensor data, ground water sensor data, water flow sensor data, clog sensor data, water pump sensor data, irrigation system sensor data, temperature sensor data, wind sensor data, weather sensor data, slope sensor data, topography sensor data, light sensor data, light intensity sensor data, image sensor data, video sensor data, object orientation sensor data, surface orientation sensor data, plant monitoring sensor data, motion sensor data, infrared sensor data, or pest detector data, and/or the like. In some cases, the one or more first parameters associated with water requirements may include, but are not limited to, at least one of humidity level, soil moisture level, water table depth, water table slope, water flow amount, water run-off characteristics, water evaporation rate, temperature, wind speed, wind direction, weather conditions, slope, topography, sun intensity level, orientation of objects, orientation of surfaces, plant color, plant size, plant shape, plant growth indicators, plant wilting indicators, or presence of pests, and/or the like.

The computing system may map the generated first water distribution plan for the first area to a positional map of the plurality of microwells (e.g., microwells 120, etc.) disposed in the corresponding plurality of pre-installed locations within the first area; may generate first command instructions for each microwell among the plurality of microwells to pump water from an underground water source and to irrigate a portion of the first area using the integrated irrigation system (e.g., irrigation system 125c, etc.), based at least in part on the mapping of the generated first water distribution plan to the positional map of the plurality of microwells; and may send, via the transceiver, the generated first command instructions to each microwell among the plurality of microwells. In some instances, the first command instructions for each microwell may include, without limitation, instructions for at least one of direction of irrigation from said microwell, angle of water dispersion along the direction of irrigation, distance of irrigation from said microwell, amount of water to disperse from said microwell, rate of water dispersion from said microwell, or timing of irrigation for said microwell, and/or the like.

According to some embodiments, at least one microwell among the microwell network 120 each may send sensor data, from the one or more first sensors and via the wireless communications system (e.g., communications system 125b, etc.), to the computing system, which is configured to control the plurality of microwells within the first area; may receive, from the computing system, the first command instructions; and may, in response to receiving the first command instructions, pump water from an underground water source using the pump and to actuate the integrated irrigation system to irrigate a portion of the first area around said microwell based on the first command instructions.

In some embodiments, the computing system may receive, from one or more second sensors (e.g., sensors 115a-115n and/or 125d, etc.), second sensor data, the second sensor data being indicative of environmental conditions within the first area prior to installation of the plurality of microwells within the first area; may analyze the second sensor data to determine one or more second parameters associated with water requirements within the first area; and may generate a second water distribution plan for the first area based at least in part on the determined one or more second parameters. The computing system may map the generated second water distribution plan for the first area to a geographical map of the first area; and may analyze the mapping of the generated second water distribution plan to the geographical map of the first area to determine placement of each of the plurality of microwells within the first area, wherein the determined placement corresponds to the plurality of pre-installed locations of the plurality of microwells. The computing system may generate the positional map of the plurality of microwells within the first area based on the determined placement of each of the plurality of microwells within the first area; and may send the generated positional map of the plurality of microwells within the first area to at least one of a user device (e.g., user device(s) 140, etc.) associated with a user or a navigation system of a device (e.g., equipment 135, etc.) configured to install each microwell within the first area.

According to some embodiments, the one or more second sensors (e.g., sensors 115a-115n and/or 125d, etc.) may include a percolation test sensor, which may be used to measure a rate at which water percolates through a portion of soil in each of one or more locations throughout the first area. In some cases, the plurality of sensors may include at least one second sensor among the one or more second sensors, where the at least one second sensor comprises a third sensor, which may be disposed in an aerial drone (e.g., drone(s) 130, etc.) that is configured to fly over the first area to collect sensor data indicative of at least one of environmental conditions, topographical features, geographical features, plantable areas, water features, land features, plant-life, or wildlife within the first area, and/or the like.

These and other functions of the system 100 (and its components) are described in greater detail below with respect to FIGS. 2-4.

Figure 2A:
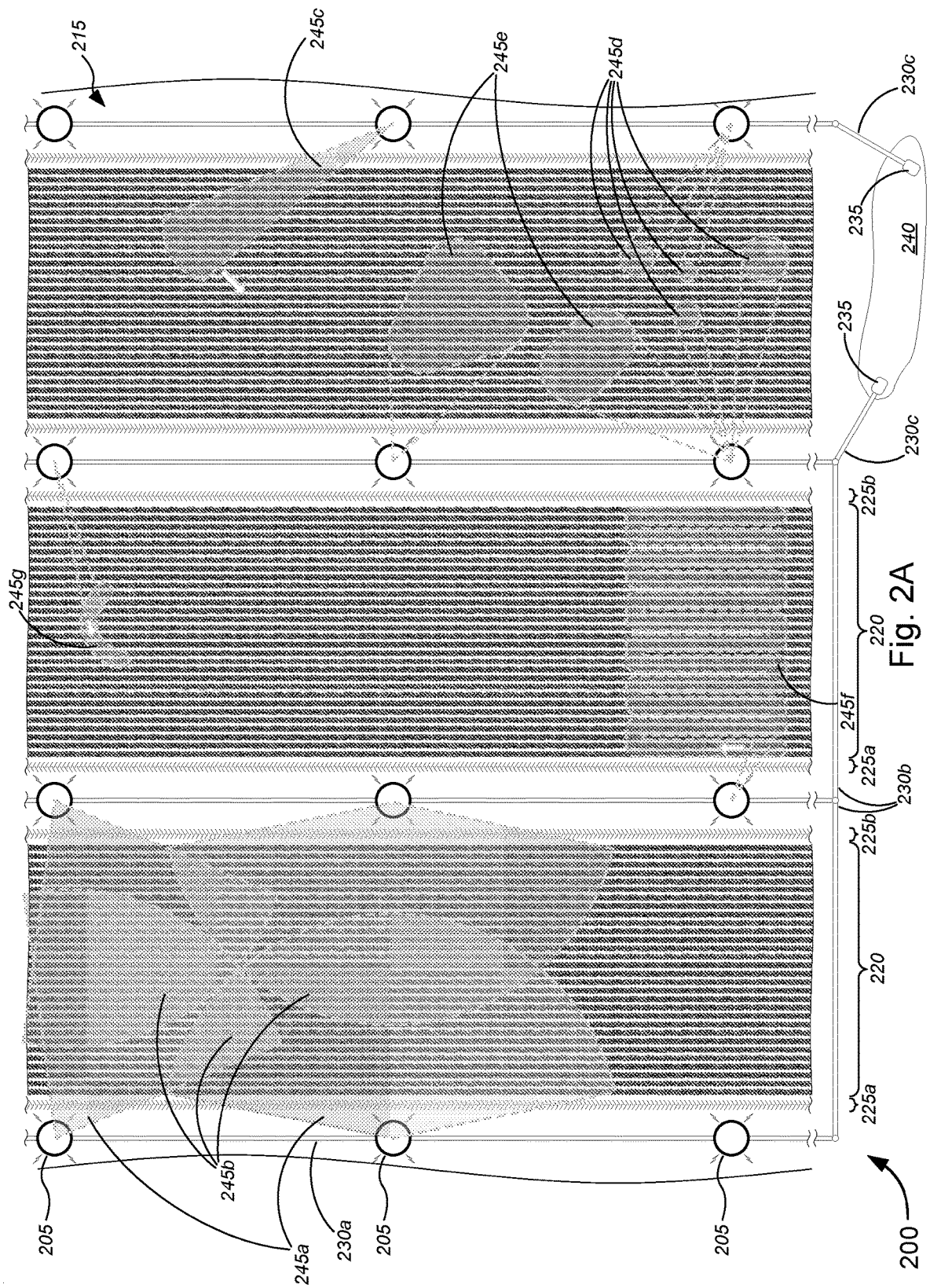
FIG. 2A is a schematic diagram illustrating a non-limiting example of a geographic area in which a microwell network may be used for implementing IoT-based microwell solution for irrigation, in accordance with various embodiments.
Figure 2B:
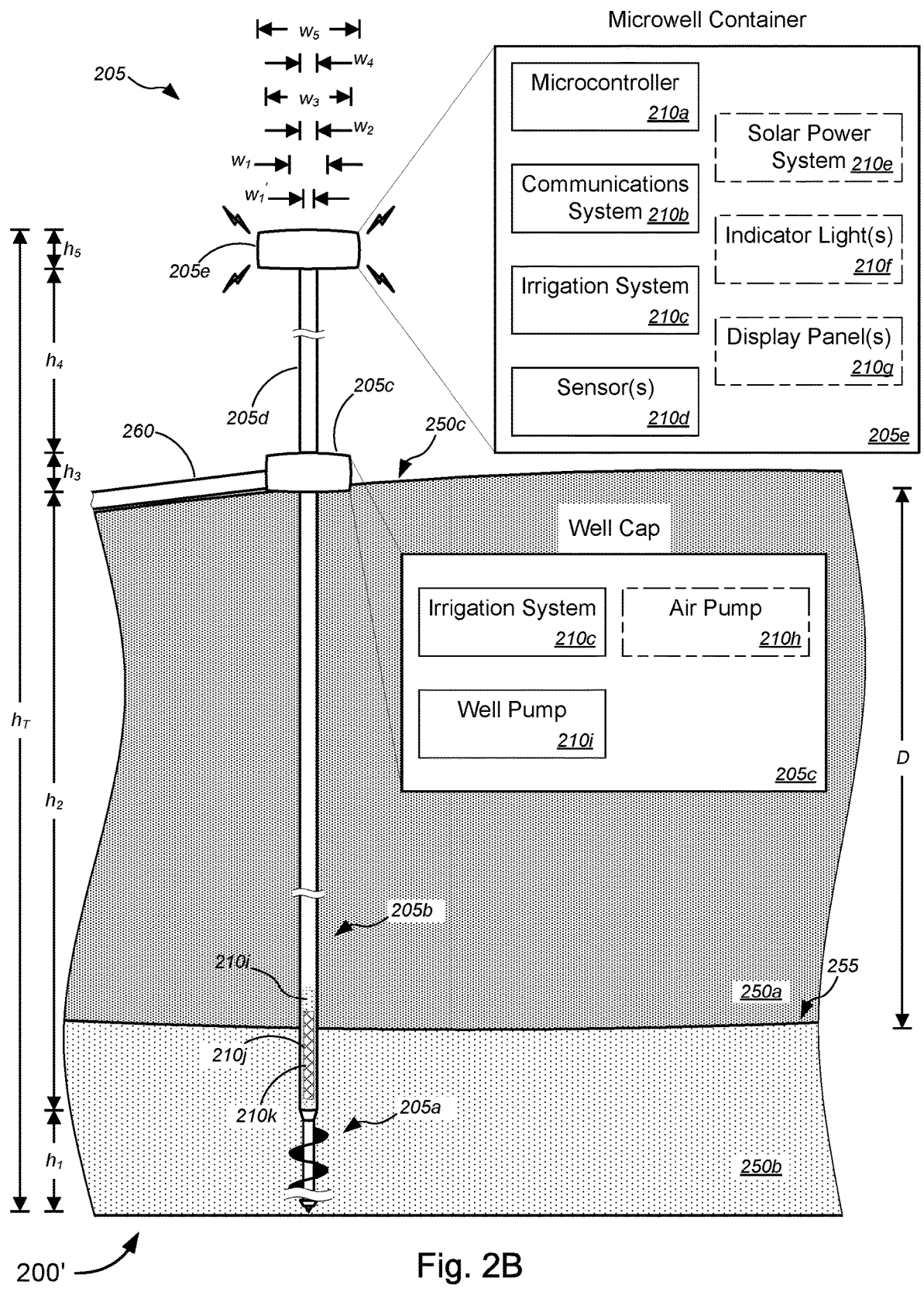
FIG. 2B is a schematic diagram illustrating a non-limiting example of a microwell that has been installed in the ground for implementing IoT-based microwell solution for irrigation, in accordance with various embodiments.

FIGS. 2A and 2B (collectively, "FIG. 2") depict non-limiting examples 200 and 200' of a microwell network and an individual microwell, respectively, in accordance with the various embodiments. FIG. 2A is a schematic diagram illustrating a non-limiting example 200 of a geographic area in which a microwell network may be used for implementing IoT-based microwell solution for irrigation, in accordance with various embodiments. FIG. 2B is a schematic diagram illustrating a non-limiting example 200' of a microwell that has been installed in the ground for implementing IoT-based microwell solution for irrigation, in accordance with various embodiments.

With reference to the non-limiting example 200 of FIG. 2A, a plurality of microwells 205 (similar to microwells 120 of FIG. 1, or the like) may be installed within a first area 215 (similar to first area 145 of FIG. 1, or the like). At least one microwell 205 may be fluidly coupled to an adjacent microwell 205 among the plurality of microwells 205 via a fluid pipe 230a or 230b and via fluid connections (not shown) between the well cap of one fluidly coupled microwell 205 and the well cap of another fluidly coupled microwell 205 to form a network of connected microwells (i.e., microwell network 205, which is similar to microwell network 120 of FIG. 1, or the like). The microwell network 205 may be used to irrigate agricultural plant-life 220, including, but not limited to, at least one of crops, sod, lawns, garden plants, etc., which may be seeded, planted, and/or grown in predetermined patterns within the first area 215 (such as the rows depicted in FIG. 2A, or the like), using equipment (such as equipment 135 of FIG. 1, or the like), tracks 225a and 225b (i.e., right-side and left-side vehicle tracks 225, or the like) of which are depicted in FIG. 2A. Although each microwell 205 is configured to extract water from underground sources (as shown in FIG. 2B, or the like), the microwell network 205, in some cases, may be configured to transport first fluids between the fluidly coupled microwells 205 using at least one transport pump disposed at one or more fluidly coupled microwells 205. In such cases, the first fluids may include, but are not limited to, at least one of water, fertilizer in a fluid medium, plant growth enhancers in a fluid medium, or insecticide in a fluid medium, and/or the like. Alternatively, or additionally, the microwell network 205 may be configured to fluidly couple, via fluid pipes 230c, with at least one surface water pump 235 that is in fluid communication with each surface water source 240 (e.g., streams, rivers, lakes, ponds, wetlands, reservoirs, creeks, swamps, etc.).

The plurality of microwells 205 may irrigate the agricultural plant-life 220 using integrated irrigation systems within each microwell 205. In some embodiments, the integrated irrigation systems may include, but is not limited to, at least one of a sprinkler-type irrigation system disposed within the at least a second portion of the integrated irrigation system or a drip-type irrigation system disposed within the at least a first portion of the integrated irrigation system. In some cases, the sprinkler-type irrigation system may include, without limitation, one of a rotary sprinkler, a stationary sprinkler, an impact sprinkler, a jet sprinkler, or a micro-sprinkler, and/or the like. In some instances, the drip-type irrigation system may include, but is not limited to, at least one of one or more drip hoses with point-source emitters, one or more drip hoses with patterned emitters, one or more drip hoses with spray jet emitters, one or more drip hoses with micro sprinkler emitters, one or more inline drip emitter hoses, one or more porous soaker hoses, or one or more drip tapes, and/or the like. As shown in FIG. 2A, sprinkler-type irrigation systems of the microwells 205 may be used to spray the first fluids (whether water from underground water source(s) or surface water source(s), or at least one of fertilizer, plant growth enhancers, or insecticide, or the like) in wide spray patterns 245a, overlapped spray patterns 245b, moving spray patterns 245c (as depicted in FIG. 2A by an arrow leading said pattern), spot spray patterns 245d, shaped spray patterns 245e, a raster spray patterns 245f (as depicted in FIG. 2A by an arrow along said pattern), drawing spray patterns 245g (as depicted in FIG. 2A by an arrow along said pattern), or some other spray patterns 245h (not shown), or the like (collectively, "spray patterns 245" or the like). The particular spray pattern(s) 245 that is used may be based on the first command instructions that are generated based at least in part on the mapping of the generated first water distribution plan to the positional map of the plurality of microwells, as described with respect to FIGS. 1 and 4, or the like.

The plurality of microwells 205 may be used as sensor platforms, with the sensor platform of each microwell 205 may include sensors including, but not limited to, at least one of one or more humidity sensors, one or more soil moisture sensors, one or more ground water sensors, one or more water flow sensors, one or more clog sensors, one or more water pump sensors, one or more irrigation system sensors, one or more temperature sensors, one or more wind sensors, one or more weather sensors, one or more slope sensors, one or more topography sensors, one or more light sensors, one or more light intensity sensors, one or more image sensors, one or more video sensors, one or more object orientation sensors, one or more surface orientation sensors, one or more plant monitoring sensors, one or more motion sensors, one or more infrared sensors, or one or more pest detectors, and/or the like. The sensor platforms may wirelessly communicate with a computing system (e.g., computing system 105a or 105b, or the like), in some cases, via a relay system (e.g., telecommunications relay system 155, or the like) and/or a drone (e.g., drone(s) 130, or the like). The lightning bolt symbols around each microwell 205 depicts wireless communications functionalities of each microwell. The sensor platforms of the microwells 205 may send sensor data, via said wireless communications, to the computing system configured to control the plurality of microwells 205 within the first area 215.

The microwells 205 may receive, from the computing system, first command instructions, the first command instructions comprising instructions for at least one of direction of irrigation, angle of water dispersion along the direction of irrigation, distance of irrigation, amount of water to disperse, rate of water dispersion, or timing of irrigation. In response to receiving the first command instructions, the microwells 205 may pump water from the underground water source(s) using the pump, from another microwell in the microwell network 205 (via fluid pipe(s) 230a and/or 230b) and/or may pump water from the surface water source(s) (via fluid pipe(s) 230a, 230b, and/or 230c) and to actuate the integrated irrigation system to irrigate a portion of the first area 215 around said microwell based on the first command instructions.

Referring to the non-limiting example 200' of FIG. 2B, each microwell 205 may include, without limitation, an auger 205a disposed at a distal end of said microwell 205, the auger 205a being configured to be inserted into the ground 250; a well cap 205c disposed at a midpoint of said microwell 205, the well cap 205c being configured to be positioned at ground level 250c; a hollow shaft 205b disposed between the auger 205a and the well cap 205c, with a distal end of the hollow shaft 205b being connected to the auger 205a and a proximal end of the hollow shaft 205b being connected to the well cap 205c; a container 205e disposed at a proximal end of said microwell 205, wherein the container 205e is configured to house a microcontroller 210a, a wireless communications system 210b for communicating with the computing system via a transceiver (depicted in FIG. 2B by lightning bolt symbols), at least a second portion of the integrated irrigation system 210c, and one or more first sensors among the plurality of sensors 210d; and a post 205d disposed between the well cap 205c and the container 205e, the post 205d configured to elevate the container 205e above ground level 250c; and/or the like. In some cases, each microwell may further include, without limitation, at least one of: a solar power system 210e disposed in the container 205e, the solar power system 210e comprising one or more solar panels and one or more batteries; at least one of an array of indicator lights 210f or a display panel 210g disposed on a surface of the container 205e; at least a first portion of the integrated irrigation system 210c being either disposed within the well cap 205c or fluidly coupled with the hollow shaft 205b via the well cap 205c; an air pump 210h (optional) disposed in the well cap 205c; a well pump 210i, the well pump 210i being either disposed within the hollow shaft 205b or disposed within the well cap 205c; at least one opening 210j along at least a portion of the distal end of the hollow shaft 205b near the auger 205a; or a particulate screen 210k disposed over each opening of the at least one opening 210j; and/or the like.

In some embodiments, the integrated irrigation system may include, but is not limited to, at least one of a sprinkler-type irrigation system disposed within the at least a second portion of the integrated irrigation system or a drip-type irrigation system disposed within the at least a first portion of the integrated irrigation system. In some cases, the sprinkler-type irrigation system may include, without limitation, one of a rotary sprinkler, a stationary sprinkler, an impact sprinkler, a jet sprinkler, or a micro-sprinkler, and/or the like. In some instances, the drip-type irrigation system may include, but is not limited to, at least one of one or more drip hoses with point-source emitters, one or more drip hoses with patterned emitters, one or more drip hoses with spray jet emitters, one or more drip hoses with micro sprinkler emitters, one or more inline drip emitter hoses, one or more porous soaker hoses, or one or more drip tapes, and/or the like. Alternatively, or additionally, the hollow shaft 205b and the post 205d may form one unitary hollow structure that comprises one or more ports configured to interface with the well cap at ground level 250c, where the well pump 210i may be disposed at one of (i) within the hollow shaft 205b, (ii) within the well cap 205c, (iii) within the container 205e, or (iv) within the at least a second portion of the integrated irrigation system 210c, and/or the like. The inner surface of the hollow shaft 205b may serve the function of steining or steening, which is a lining of a well to prevent caving in or washing away of soil in the ground 250. The microwell 205 may fluidly couple with an adjacent microwell via fluid pipe 260, in a manner similar to that as described above regarding fluid pipes 230a, 230b, and/or 230c. Although fluid pipe 260 is shown in FIG. 2B as being an above-ground installation, the various embodiments are not so limited, and fluid pipe 260 (like fluid pipes 230a, 230b, and/or 230c) may be above-ground installations, under-ground installations (whether a few inches (or centimeters) or a few feet (or meters) below the surface), or a combination of above-ground and under-ground installations, or the like.

Each microwell 205 may be installed in the ground 250 to a depth D below ground surface 250c to a water table level 255, which is the level or depth between unsaturated ground 250a and water saturated ground 250b, with the at least one opening 210j (and thus the particulate screen 210k) being set to be at or below the water table level 255 (as shown, e.g., in FIG. 2B). Each microwell 205 may have an end-to-end height or length $h_T$, which may be between about 5 to about 50 feet (e.g., about 5, 10, 15, 20, 25, 30, 35, 40, 45, or 50 ft, or any height or length between; or between about 1.5 to about 15.2 m, e.g., about 1.5, 3.0, 4.6, 6.1, 7.6, 9.1, 10.7, 12.2, 13.7, or 15.2 m, or any height or length between). The auger 205a may have a height or length $h_1$ and an auger blade width (or diameter) $w_1$ and an auger shaft width (or diameter) $w_1'$. In some cases, height or length $h_1$ may be between about 1 to about 10 feet (e.g., about 1, 2, 3, 4, 5, 6, 7, 8, 9, or 10 ft, or any height or length between; or between about 0.3 to about 3.0 m, e.g., about 0.3, 0.6, 0.9, 1.2, 1.5, 1.8, 2.1, 2.4, 2.7, or 3.0 m, or any height or length between). The hollow shaft 205b may have a height or length $h_2$ and a width (for non-cylindrical shaft; in some cases, diameter for cylindrical shaft) $w_2$, which may be between about 0.5 to about 2 inches (e.g., about 0.5, 0.75, 1.0, 1.25, 1.5, 1.75, or 2 inches, or any width or diameter between; or between about 1.3, 1.9, 2.5, 3.2, 3.8, 4.4, or 5.1 cm, or any width or diameter between). The well cap 205c may have a height or length $h_3$ and a width (for non-cylindrical well cap; in some cases, diameter for cylindrical well cap) $w_3$. The post 205d may have a height or length $h_4$ and a width (for non-cylindrical post; in some cases, diameter for cylindrical post) $w_4$. The container 205e may have a height or length $h_5$ and a width (for non-cylindrical container; in some cases, diameter for cylindrical container) $w_5$. The end-to-end height or length $h_1'$ may equal a sum of heights (or lengths) $h_1$, $h_2$, $h_3$, $h_4$, and $h_5$.

In some embodiments, the hollow shaft 205b may be either integrated with the auger 205a or removably affixed via appropriate connector (including, but not limited to, (i) threaded connector along the axis of each of the hollow shaft 205b and the auger 205a with screw or bolt locks along the radial direction to prevent unintended disconnection [referred to herein as "lockable threaded connector" or the like], (ii) spring-loaded ball bearing-based quick connector, or (iii) other suitable removable connectors that prevent unintended disconnection between structures that may be rotated clockwise or counter-clockwise within the ground. In some cases, the hollow shaft 205b (whether integrated with or removably affixed to the auger 205a) may be embodied either as a singular structure or as one or more interconnectable parts or extensions, the interconnectable parts or extensions enabling the height or length $h_2$ to be increased (or decreased) by increments (or decrements) of the height or length of each extension by addition (or removal) of the desired number of extensions. Two or more extensions may be removably affixed to each adjacent extension in a similar manner as described above with respect to removably affixing the hollow shaft 205b to the auger 205a (i.e., via lockable threaded connector, spring-loaded ball-bearing-based quick connector, or other suitable connector, or the like). Likewise, the post 205d may be embodied either as a singular structure or as one or more interconnectable parts or extensions in a similar manner as the hollow shaft 205b for similar purposes. In some cases, the extensions for the hollow shaft 205b and for the post 205d may be interchangeable and/or of the same type, construction, shape, dimensions, etc. An appropriate fluid connector or splitter may be disposed within well cap 205c to fluidly connect the post 205d with the hollow shaft 205b, while splitting perpendicular to the axis of each of the post 205d and the hollow shaft 205b to fluidly connect the post 205d and the hollow shaft 205b with at least one of adjacent microwells via fluid pipe(s) 260, a reservoir or container (not shown) for other fluids (e.g., fertilizer in a fluid medium, plant growth enhancers in a fluid medium, or insecticide in a fluid medium, and/or the like) via hose connection or via one or more fluid pipe(s) 260, or an integrated air pump 210h or an external air pump (not shown) via an air hose connection (for clearing the lines of fluid, such as for winterizing the system, for cleaning the system, for testing the system, or the like), and/or the like.

In some aspects, a microwell 205 may be embodied by a 8 to 15 foot (or about 2.4 to 4.6 m) long (or other length corresponding to heights $h_T$ or $h_1+h_2$ described above, or the like), very narrow, hollow auger (e.g., about 1 inch or about 2.5 cm in diameter auger if the tensile strength could hold to about 10 feet or about 3.0 m) with one or more slots (e.g., openings 210j, or the like) at the bottom up about 5 feet or so from the auger part (e.g., tip of the auger 205a) and with an interior finer screened tube (e.g., particulate screen 210k, or the like), similar to that in a regular well casing with the hollow shaft acting as well steining or steening, only on a smaller scale compared with conventional wells. In some cases, the narrow, hollow shaft may be suitable for a jet pump based on suction. Alternatively, a submersible pump (e.g., a micro-pump, or the like) based on pressure for a high volume pump may be used. At the top 3 to 5 feet (e.g., about 0.9 to 1.5 m) from the end (depending on expected crop height), a cap-like disk (e.g., container 205e) may be disposed and that would be the point up to which the microwell was driven into the ground, with the rest of the top part of the shaft acting as the steining (i.e., a well lining to prevent caving in or washing away of soil, or the like), well curb and well cap combined. This cap may also contain a moisture sensor (and/or any combination of the sensors described above). At the very top end may be disposed a combined solar panel and jet pump with IoT capability on board, or may be fabricated down a bit so the end of the microwell could be attached to the rig driving it.

The system may incorporate security and maintenance features. In some instances, the security features may be used to send an alert to the user, land-owner, operators, and/or service provider providing the IoT network services, in response to a failure to receive a regularly scheduled signal or in response to detecting movement and/or receiving IoT alarms. In some cases, the maintenance features may include use of compressed air through a maintenance fitting in the shaft of the microwell to clear any blockages (different from clearing of conventional wells, which involves very cold material being thrown down the well, followed by a small explosive charge to shock the well open and/or to clear the screens, etc.). In the case that the microwell blockage cannot be cleared, the microwell may be removed, cleaned, and installed in another location, or a new microwell may be installed in another location to replace the blocked one. In some instances, a light (e.g., indicator light(s) 210f, or the like) may be disposed at the top that would flash to show the operator which microwell(s) needed maintenance when looking over a field after receiving IoT alarms. Alternatively, or additionally, a speaker may be disposed at the top that would either provide an audible tone, sound, or voice-based message indicating to the operator which microwell(s) needed maintenance when looking over a field after receiving IoT alarms.

IoT-enabled precision may be used in implementing the following process for installation of the microwells:

(1) Based on the metrics of past harvests and the exact (e.g., down to the square dimension (e.g., square foot, square meter, etc.) topology of the land), a "farm plan" or water distribution plan may be created that combines all those metrics to indicate how to best water the field and ultimately where to plant or install the microwells. Other factors that may be considered in creating the "farm plan" or water distribution plan may include, without limitation, amount of water required by each type of plant or crop, time of day for optimal watering, orientation of plants or crops on the land (e.g., orientation with respect to the sun, etc.), taking advantage of slopes, results of soil percolation tests throughout the field, etc.

(2) The farmer would fertilize and plant the crops.

(3) A microwell service provider would come in with the farm plan and would plant or install the microwells appropriately and to bring it online. Based on the farm plan, irrigation lines (which may be disposable, biodegradable, and/or chewed up during harvest, or the like) that are attached to the microwells could be quickly spread out and oriented to said farm plan for proper field flooding. The goal to achieve the most coverage with the least number of microwells may depend on the precision of the farm plan. The use of IoT-capable sensors and IoT-capable microwells would enable greater precision in formulating the farm plan and for continued optimization of the farm plan even after installation of microwells. In some cases, based on updated IoT-based sensor data from the sensors and/or microwells, the farm plan may be updated to include additional (or turn-off already installed) microwells and/or redirect flow of water among the installed microwells, or the like.

In the case that microwells are removed at the end of the planting season (as opposed to the case where microwells are permanently or semi-permanently left installed in the ground for years or decades, or the like), to remove microwells from the ground, one embodiment may utilize either a "sidecar" mounted on a harvester (or other equipment) that has a very small boom or the like that is configured to grab or capture the top of each microwell, to spin or rotate it out of the ground, and to place it to the side or back of the harvester by drilling it a foot or two into the ground to stand it up or by laying it on the ground for the microwell service provider to pick up at a later time. Alternatively, the microwell service provider may utilize a boom-equipped truck to follow the harvester and to pull the microwells out of the next X rows over to be harvested on the next pass (e.g., about the width of the harvester, or the like).

In a non-limiting use case, an agricultural field may require 300 gallons of water to sufficiently water the crops planted therein. A gallon is 231 cubic inches. 300 gallons is 69,300 cubic inches. That is about 480 square feet at 1 inch of water per day or about 3370 square feet at 1 inch of water per week. For really sandy soil that does not hold water well, one would need an inch a week at a worst case. An acre is 43560 square feet, which means 1 acre divided by 3370 square feet equals 43560 square feet divided by 3370 sq feet equals about 13 microwells an acre in very worst case assuming each microwell can produce its share of water (or the total number of microwells can produce 300 gallons of water a day).

In some aspects, the microwells may be permanently installed at least two harvester widths apart in both dimensions. They would not be in the plant line but would instead be in the track where the harvester wheels would travel and the harvester could be used to work between them. The microwells would have irrigation lines running between them and valved with IoT-based valves to control them such that they could work in union to create enough pressure to sprinkle or spray water at a distance out of any one (or N number) of them at a time (compared to where each would have worked independently and just drained immediately to a patterned ground for distribution). This would provide sufficient "reach" to water a field without needing to have excessive numbers of microwells installed and likewise could be more permanent so that one could go deeper if need be. The precision IoT implementation may be used to facilitate and optimize such microwell implementation.

In some embodiments, the precision IoT implementation may include an automated drone flight(s) that would use an IoT-based drone(s) to fly the boundaries of the field (or fields) for complete coverage. Artificial intelligence ("AI") algorithms may be used to analyze the crops and/or environmental conditions and to compute where water should next be applied, based at least on one or more of sun position, sunlight amount, humidity, wind direction, wind speed, day in growing season for particular crop(s), local weather forecasts, and/or drone visual crop inspection (e.g., crop size, crop shape, color, etc.), and/or the like. Using that analysis with the "farm plan," the system would keep the water precisely directed. Each microwell sprinkler would be configured with IoT to valve appropriately to spray out of its own sprinkler head or redirect its pumped water each way to other microwells in the respective watering line. Likewise, the microwell would not just sprinkle in a circle but may be used to spray at a particular direction and at a particular distance (and/or using the spray patterns 245 described above) as instructed by the analysis combined with the farm plan.

According to some embodiments, where the land has surface water sources, the microwell network or system may be enhanced by running a line from the surface water source(s) to the microwell watering line and boosting the water distribution of the microwell network with use of an electric pump or the like that would be feasible at the edges of the field.

In some embodiments, a sidecar with a micro- or nano-processor (e.g., Raspberry Pi® or other general purpose small single-board computers ("SBCs"), finite state machine or other custom-designed circuit boards, or other electronics, etc.), with IoT platform functionalities (in some cases, with ThingsBoard® based IoT functionalities, etc.) and with long range and/or low power wide area networking functionalities (e.g., using long range ("LoRa") wide area network or LoRaWAN® or other networking protocols, etc.), may be used for driving precision, decision, and/or automation of the microwells, in some instances, controlling actuators driving valves on the base of one or more microwells at ground level, including (a) implementing teaming of two or more microwells configured to switch flow either up a given microwell or out to the side of other teams microwells connected in tandem in order to throw or spray water up to 50 feet or more, and/or (b) using servo-based control for implementing directional precision of the water spout, etc. In some cases, software may be used to lay down a base grid using coordinates (e.g., military coordinates, geographical coordinates, etc.) of the types of soils (as determined using perc tests every square meter, etc.) so as to implement distribution of water statically. Alternatively, software may be used to implement AI-coupled with drone functionalities to lay down next one or more layers of grid so as to implement distribution of water dynamically per the metrics captured daily (e.g., sun, humidity, drone visual crop inspection, wind, day in season, forecasts, etc., . . . , one per layer). According to some embodiments, the microwells are positioned per available near ground surface water (e.g., 8 to 15 feet, or the like) or surface water that is available on the land, with an expected coverage of ~50 foot radius thereby allowing ~100 feet width for a harvester to go between two microwells among the plurality of microwells. A base static layer may be mapped with dynamic layers mapped above the base layer, with the system configured to determine whether or not to team two or more microwells, or the like. Daily drone-based metrics collection may be analyzed and used to provide metrics for the dynamics layers, etc.

For maintenance at the end of the season, the microwell system may include a mode in which it could automatically "blow its lines" prior to the winter freeze, not unlike winterizing processes in a residential home irrigation system. In some embodiments, the drone may be instructed to hover while watering as a regular maintenance check to ensure that the reach of the sprinklers is actually occurring as expected.

According to some embodiments, where the microwells are permanently installed, they may be used to control autonomous vehicles more accurately than GPS systems. Likewise, small underground lines may be run to them to augment the water and pressure, and, in some cases, chemicals for killing or preventing bugs and weeds could be piped in through the small underground lines. The application of such could be more accurate and timely, while being completely automated. This enables a farmer to only be in the field twice a growing season—i.e., once to plant and once to harvest—, thereby making it less of a need to own a tractor, which may be owned a shared cooperative of neighboring or regional farmers. The microwell system allows for lower installation expenses along with lower operating expenses compared with a traditional well, which is very costly to install and costly on an ongoing basis due to applicable taxes. Further, the crops could be planted tighter together since no wheel tracks would then be necessary for the tractor thereby increasing yields considerably.

Figure 3:
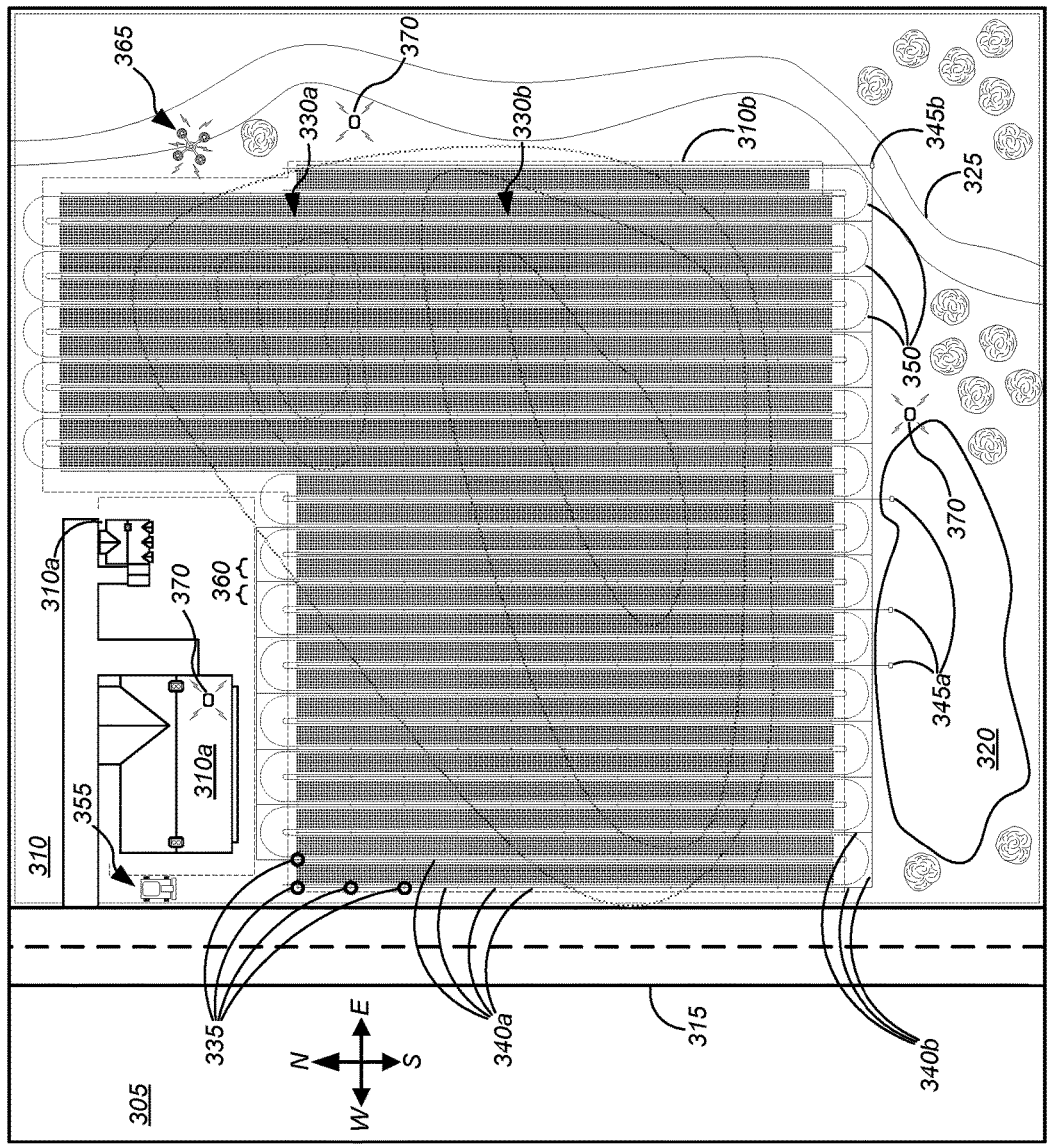
FIG. 3 is a schematic diagram illustrating a non-limiting example of a geographic area in which IoT-based microwell solution for irrigation may be implemented, in accordance with various embodiments.

FIG. 3 is a schematic diagram illustrating a non-limiting example 300 of a geographic area in which IoT-based microwell solution for irrigation may be implemented, in accordance with various embodiments.

With reference to the non-limiting example 300 of FIG. 3, geographic location or region 305 (or "geographic area 305" or the like), which might include, without limitation, one or more first areas 310 (which might include, but are not limited to, at least one of an agricultural field, a farm, a plot of land, a crop field, a sod farm, a residential lawn, a commercial lawn, a residential garden, or a commercial garden, and/or the like), one or more roadways or vehicular paths 315, one or more standing surface water sources 320 (e.g., lakes, ponds, wetlands, reservoirs, swamps, etc.), one or more moving surface water sources 325 (i.e., waterways or watercourses; e.g., rivers, streams, creeks, brooks, rivulets, gullies, rills, aqueducts, or canals, and/or the like), and one or more hills or rises 330a and 330b (collectively, "hills 330" or "rises 330," or the like; depicted in FIG. 3 by gray-colored contour lines), or the like. In some cases, the one or more first areas 310 might include, but are not limited to, houses, barns, or other structures, and/or the like (collectively, "structures 310a" or the like) and growing field 310b or the like.

In some embodiments, a plurality of microwells 335 (similar to microwells 120 and 205 of FIGS. 1 and 2, or the like) may be installed within growing field 310b (similar to first area 145 and 215 of FIGS. 1 and 2, or the like). At least one microwell 335 may be fluidly coupled to an adjacent microwell 335 among the plurality of microwells 335 via a fluid pipe(s) 340a or 340b and via fluid connections (not shown) between the well cap of one fluidly coupled microwell 335 and the well cap of another fluidly coupled microwell to form a network of connected microwells (i.e., microwell network 335, which is similar to microwell network 120 and 205 of FIGS. 1 and 2, or the like). The microwell network 335 may be used to irrigate agricultural plant-life 360, including, but not limited to, at least one of crops, sod, lawns, garden plants, etc., which may be seeded, planted, and/or grown in predetermined patterns within the growing field 310b (such as the rows depicted in FIG. 3, or the like), using equipment 355 (including, but not limited to, cutters, mowers, and/or shredders; harvesting equipment; hay equipment; forage equipment; planting equipment; seeding equipment; tillage equipment; garden equipment, etc.; similar to equipment 135 of FIG. 1, or the like), tracks 350 of which are depicted in FIG. 3. Although each microwell 335 is configured to extract water from underground sources (e.g., as shown in FIG. 2B, or the like), the microwell network 335, in some cases, may be configured to transport first fluids between the fluidly coupled microwells 335 using at least one transport pump disposed at one or more fluidly coupled microwells 335. In such cases, the first fluids may include, but are not limited to, at least one of water, fertilizer in a fluid medium, plant growth enhancers in a fluid medium, or insecticide in a fluid medium, and/or the like. Alternatively, or additionally, the microwell network 335 may be configured to fluidly couple, via fluid pipes 340a or 340b, with at least one surface water pump 345a or 345b that is in fluid communication with each surface water source 320 or 325.

The plurality of microwells 335 may irrigate the agricultural plant-life 360 using integrated irrigation systems within each microwell 335. In some embodiments, the integrated irrigation systems may include, but is not limited to, at least one of a sprinkler-type irrigation system disposed within the at least a second portion of the integrated irrigation system or a drip-type irrigation system disposed within the at least a first portion of the integrated irrigation system. In some cases, the sprinkler-type irrigation system (e.g., as depicted by the spray patterns 245 in FIG. 2A, or the like) may include, without limitation, one of a rotary sprinkler, a stationary sprinkler, an impact sprinkler, a jet sprinkler, or a micro-sprinkler, and/or the like. In some instances, the drip-type irrigation system may include, but is not limited to, at least one of one or more drip hoses with point-source emitters, one or more drip hoses with patterned emitters, one or more drip hoses with spray jet emitters, one or more drip hoses with micro sprinkler emitters, one or more inline drip emitter hoses, one or more porous soaker hoses, or one or more drip tapes, and/or the like.

According to some embodiments, a drone 365 might travel within the geographic area 305. In some cases, the drone 365 might travel along one or more paths through the geographic area 305. In some embodiments, the drone 365 might include, without limitation, one of an aerial drone (as depicted in FIG. 3), a land-based drone (not shown), a water-based drone (not shown), or an autonomous vehicle (not shown), and/or the like. Like microwells 205, the plurality of microwells 335 may be used as sensor platforms, with the sensor platform of each microwell 335 may include sensors including, but not limited to, at least one of one or more humidity sensors, one or more soil moisture sensors, one or more ground water sensors, one or more water flow sensors, one or more clog sensors, one or more water pump sensors, one or more irrigation system sensors, one or more temperature sensors, one or more wind sensors, one or more weather sensors, one or more slope sensors, one or more topography sensors, one or more light sensors, one or more light intensity sensors, one or more image sensors, one or more video sensors, one or more object orientation sensors, one or more surface orientation sensors, one or more plant monitoring sensors, one or more motion sensors, one or more infrared sensors, or one or more pest detectors, and/or the like. The sensor platforms of the microwells 335 may send sensor data, via said wireless communications, to the computing system configured to control the plurality of microwells 335 within the first area 310b. In some instances, one or more data relay systems 370 may be used to relay wireless communications (depicted in FIG. 3 by lightning bolt symbols) among at least two of a computing system (not shown in FIG. 3; similar to computing system 105a or 105b of FIG. 1, or the like), one or more sensors (similar to sensors 115a-115n, 125d, and 210d of FIGS. 1 and 2, or the like), and drone 365 (similar to drone(s) 130 of FIG. 1, and/or the like).

The microwells 335 may receive, from the computing system, first command instructions, the first command instructions comprising instructions for at least one of direction of irrigation, angle of water dispersion along the direction of irrigation, distance of irrigation, amount of water to disperse, rate of water dispersion, or timing of irrigation, and/or the like. In response to receiving the first command instructions, the microwells 335 may pump water from the underground water source(s) using the pump, from another microwell in the microwell network 335 (via fluid pipe(s) 340a and/or 340b) and/or may pump water from the surface water source(s) (via fluid pipe(s) 340a and/or 340b) and to actuate the integrated irrigation system to irrigate a portion of the first area 310b around said microwell based on the first command instructions.

The microwell network 335 may otherwise function in a similar manner as microwell network 120 or 205 of FIG. 1 or 2, or the like.

Figure 4A:
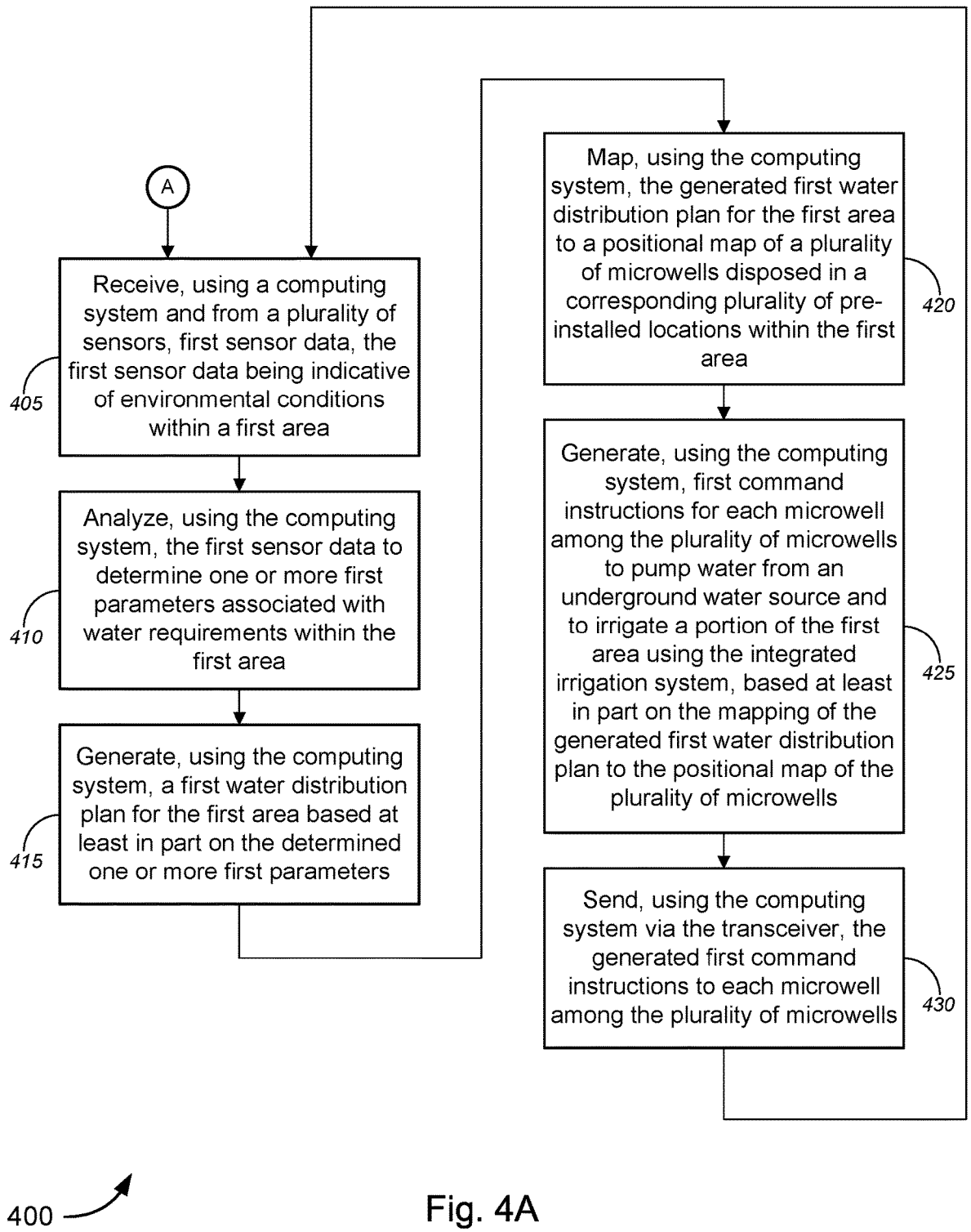
FIGS. 4A and 4B are flow diagrams illustrating a method for implementing IoT-based microwell solution for irrigation, in accordance with various embodiments.
Figure 4B:
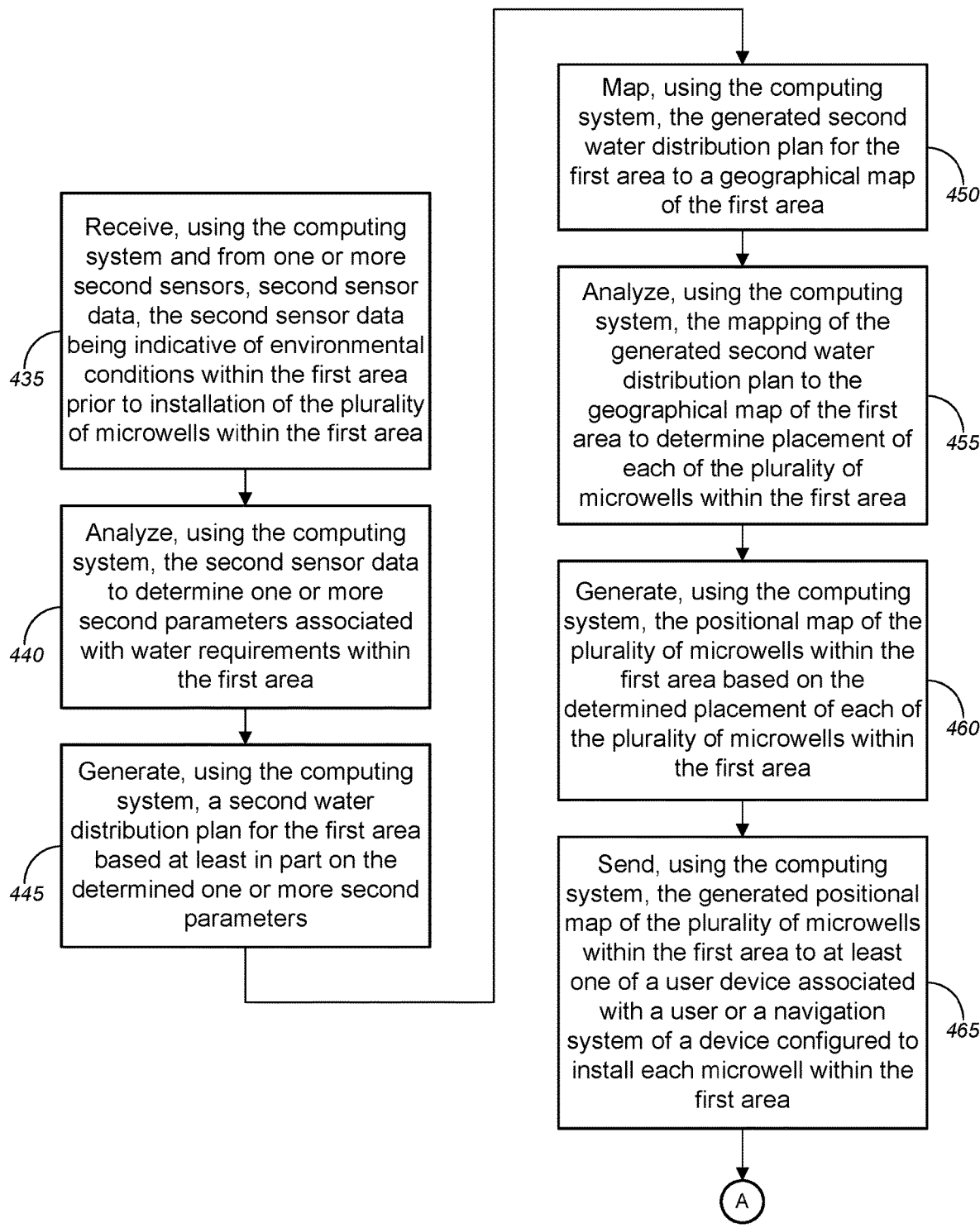

FIGS. 4A and 4B (collectively, "FIG. 4") are flow diagrams illustrating a method 400 for implementing IoT-based microwell solution for irrigation, in accordance with various embodiments. Method 400 of FIG. 4B returns to FIG. 4A following the circular marker denoted, "A.".

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 200', and 300 of FIGS. 1, 2A, 2B, and 3, respectively (or components thereof), such methods may also be implemented using any suitable hardware (or software) implementation. Similarly, while each of the systems, examples, or embodiments 100, 200, 200', and 300 of FIGS. 1, 2A, 2B, and 3, respectively (or components thereof), can operate according to the method 400 illustrated by FIG. 4 (e.g., by executing instructions embodied on a computer readable medium), the systems, examples, or embodiments 100, 200, 200', and 300 of FIGS. 1, 2A, 2B, and 3 can each also operate according to other modes of operation and/or perform other suitable procedures.

In the non-limiting embodiment of FIG. 4A, method 400, at block 405, may comprise receiving, using a computing system and from a plurality of sensors, first sensor data, the first sensor data being indicative of environmental conditions within a first area. In some embodiments, the computing system may include, without limitation, at least one of a farm management computing system, a crop management computing system, a lawn management computing system, an irrigation control system, a microwell control system, a server computer, a cloud computing system, or a distributed computing system, and/or the like. In some cases, the first sensor data may include, but is not limited to, at least one of humidity sensor data, soil moisture sensor data, ground water sensor data, water flow sensor data, clog sensor data, water pump sensor data, irrigation system sensor data, temperature sensor data, wind sensor data, weather sensor data, slope sensor data, topography sensor data, light sensor data, light intensity sensor data, image sensor data, video sensor data, object orientation sensor data, surface orientation sensor data, plant monitoring sensor data, motion sensor data, infrared sensor data, or pest detector data, and/or the like. In some instances, the first area may include, without limitation, at least one of an agricultural field, a farm, a plot of land, a crop field, a sod farm, a residential lawn, a commercial lawn, a residential garden, or a commercial garden, and/or the like.

At block 410, method 400 may comprise analyzing, using the computing system, the first sensor data to determine one or more first parameters associated with water requirements within the first area. According to some embodiments, the one or more first parameters associated with water requirements may include, but are not limited to, at least one of humidity level, soil moisture level, water table depth, water table slope, water flow amount, water run-off characteristics, water evaporation rate, temperature, wind speed, wind direction, weather conditions, slope, topography, sun intensity level, orientation of objects, orientation of surfaces, plant color, plant size, plant shape, plant growth indicators, plant wilting indicators, or presence of pests, and/or the like.

Method 400 may further comprise generating, using the computing system, a first water distribution plan for the first area based at least in part on the determined one or more first parameters (block 415); and mapping, using the computing system, the generated first water distribution plan for the first area to a positional map of a plurality of microwells disposed in a corresponding plurality of pre-installed locations within the first area (block 420).

In some embodiments, each microwell may include, without limitation, a pump, an integrated irrigation system, and a wireless communications system for communicating with the computing system via a transceiver. In some instances, each microwell may further include, without limitation, an auger disposed at a distal end of said microwell, the auger being configured to be inserted into the ground; a well cap disposed at a midpoint of said microwell, the well cap being configured to be positioned at ground level; a hollow shaft disposed between the auger and the well cap, with a distal end of the hollow shaft being connected to the auger and a proximal end of the hollow shaft being connected to the well cap; at least one opening along at least a portion of the distal end of the hollow shaft near the auger, the pump being either disposed within the hollow shaft or disposed within the well cap, and at least a first portion of the integrated irrigation system being either disposed within the well cap or fluidly coupled with the hollow shaft via the well cap; a particulate screen disposed over each opening of the at least one opening; a container disposed at a proximal end of said microwell, wherein the container is configured to house a microcontroller, the wireless communications system, at least a second portion of the integrated irrigation system, and one or more first sensors among the plurality of sensors; and a post disposed between the well cap and the container, the post configured to elevate the container above ground level; and/or the like. In some cases, each microwell may further include, without limitation, at least one of: a solar power system disposed in the container, the solar power system comprising one or more solar panels and one or more batteries; or at least one of an array of indicator lights or a display panel disposed on a surface of the container; and/or the like.

According to some embodiments, the integrated irrigation system may include, but is not limited to, at least one of a sprinkler-type irrigation system disposed within the at least a second portion of the integrated irrigation system or a drip-type irrigation system disposed within the at least a first portion of the integrated irrigation system. In some cases, the sprinkler-type irrigation system may include, without limitation, one of a rotary sprinkler, a stationary sprinkler, an impact sprinkler, a jet sprinkler, or a micro-sprinkler, and/or the like. In some instances, the drip-type irrigation system may include, but is not limited to, at least one of one or more drip hoses with point-source emitters, one or more drip hoses with patterned emitters, one or more drip hoses with spray jet emitters, one or more drip hoses with micro sprinkler emitters, one or more inline drip emitter hoses, one or more porous soaker hoses, or one or more drip tapes, and/or the like. Alternatively, or additionally, the hollow shaft and the post may form one unitary hollow structure that comprises one or more ports configured to interface with the well cap at ground level, where the pump is disposed at one of (i) within the hollow shaft, (ii) within the well cap, (iii) within the container, or (iv) within the at least a second portion of the integrated irrigation system, and/or the like.

Merely by way of example, in some cases, at least one microwell may be fluidly coupled to an adjacent microwell among the plurality of microwells via a fluid pipe and via fluid connections between the well cap of one fluidly coupled microwell and the well cap of another fluidly coupled microwell to form a network of connected microwells. In some cases, the fluid pipe may be configured to transport first fluids between the fluidly coupled microwells using at least one transport pump disposed at one or more fluidly coupled microwells. In some instances, the first fluids may include, but are not limited to, at least one of water, fertilizer in a fluid medium, plant growth enhancers in a fluid medium, or insecticide in a fluid medium, and/or the like. According to some embodiments, the network of connected microwells may fluidly couple with a combination of one or more underground water sources and one or more surface water sources. In some cases, the network of connected microwells may be fluidly coupled with each underground water source via one of the plurality of microwells. In some instances, the network of connected microwells may be fluidly coupled with each surface water source via at least one surface water pump in fluid communication with each surface water source and via a corresponding fluid pipe in fluid communication with at least one microwell in the network of connected microwells.

At block 425, method 400 may comprise generating, using the computing system, first command instructions for each microwell among the plurality of microwells to pump water from an underground water source and to irrigate a portion of the first area using the integrated irrigation system, based at least in part on the mapping of the generated first water distribution plan to the positional map of the plurality of microwells. In some embodiments, the first command instructions for each microwell may include, without limitation, instructions for at least one of direction of irrigation from said microwell, angle of water dispersion along the direction of irrigation, distance of irrigation from said microwell, amount of water to disperse from said microwell, rate of water dispersion from said microwell, or timing of irrigation for said microwell, and/or the like. Method 400 may further comprise, at block 430, sending, using the computing system via the transceiver, the generated first command instructions to each microwell among the plurality of microwells.

Method 400 may then return to the process at block 405, and the processes at blocks 405-430 may be repeated on one of a continual manner, a periodic manner, or a random manner, and/or in response to user input, as appropriate or as desired.

With reference to non-limiting embodiment of FIG. 4B, method 400 may further comprise, at block 435, receiving, using the computing system and from one or more second sensors, second sensor data, the second sensor data being indicative of environmental conditions within the first area prior to installation of the plurality of microwells within the first area. At block 440, method 400 may comprise analyzing, using the computing system, the second sensor data to determine one or more second parameters associated with water requirements within the first area. Method 400 may further comprise generating, using the computing system, a second water distribution plan for the first area based at least in part on the determined one or more second parameters (block 445); mapping, using the computing system, the generated second water distribution plan for the first area to a geographical map of the first area (block 450); analyzing, using the computing system, the mapping of the generated second water distribution plan to the geographical map of the first area to determine placement of each of the plurality of microwells within the first area, wherein the determined placement corresponds to the plurality of pre-installed locations of the plurality of microwells (block 455); and generating, using the computing system, the positional map of the plurality of microwells within the first area based on the determined placement of each of the plurality of microwells within the first area (block 460). Method 400, at block 465, may comprise sending, using the computing system, the generated positional map of the plurality of microwells within the first area to at least one of a user device associated with a user or a navigation system of a device configured to install each microwell within the first area.

In some embodiments, the one or more second sensors may include, but are not limited to, a percolation test sensor, or the like. In some instances, the percolation test sensor may be used to measure a rate at which water percolates through a portion of soil in each of one or more locations throughout the first area. According to some embodiments, the plurality of sensors may include at least one second sensor among the one or more second sensors. In some cases, the at least one second sensor may include, without limitation, a third sensor, which may be disposed in an aerial drone that is configured to fly over the first area to collect sensor data indicative of at least one of environmental conditions, topographical features, geographical features, plantable areas, water features, land features, plant-life, or wildlife, and/or the like, within the first area. Merely by way of example, in some cases, the computing system may autonomously communicate with each microwell among the plurality of microwells and with each of the plurality of sensors using Internet of Things ("IoT")-based communications protocols, or the like.

Method 400 may return to the process at block 405 in FIG. 4A following the circular marker denoted, "A."

Exemplary System and Hardware Implementation

Figure 5:
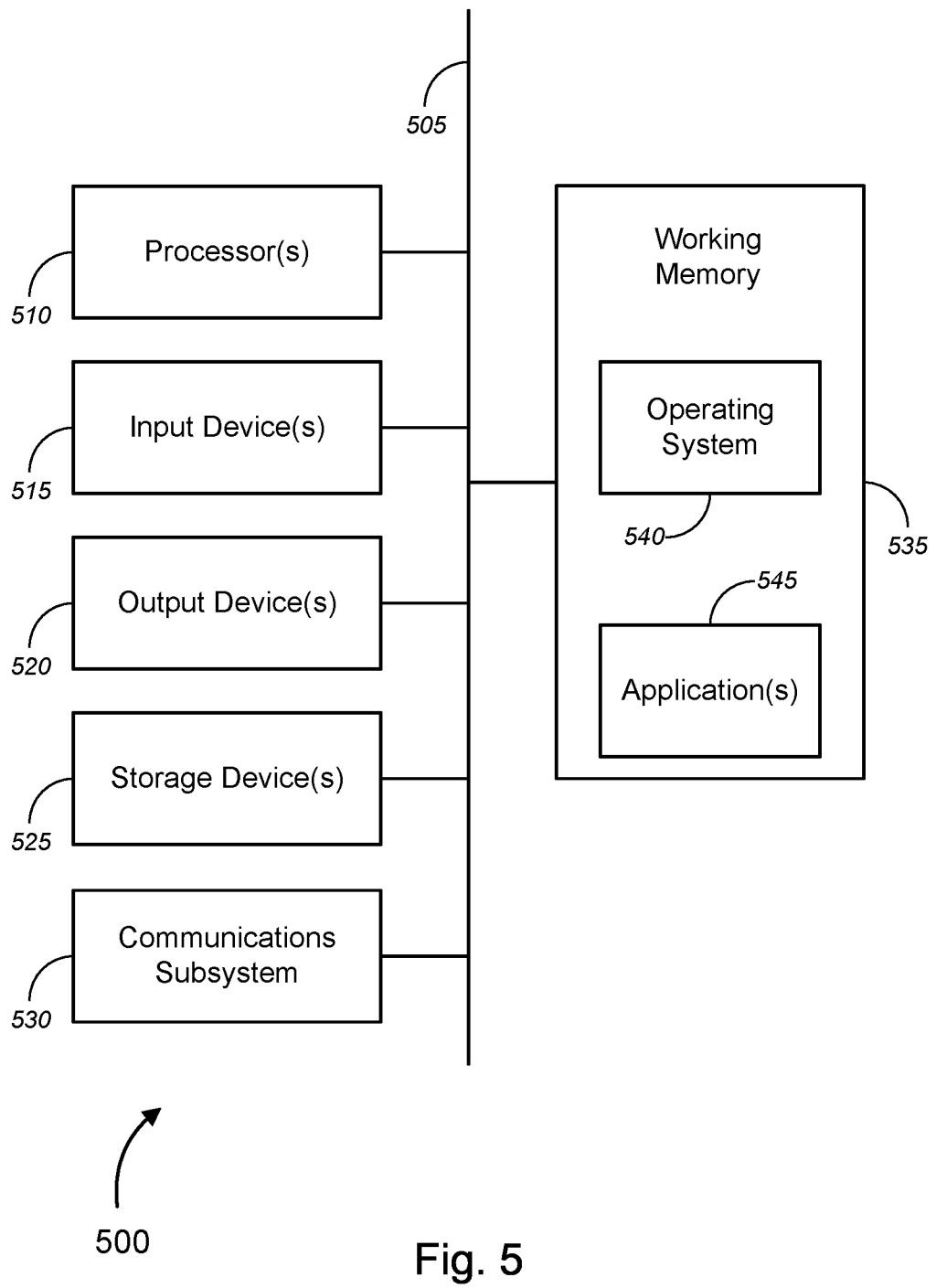
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105a and 105b, Internet of Things ("IoT")-capable sensors 115a-115n, IoT-capable microwells 120a-120n, 205, and 335, microcontrollers 125a and 210a, sensors 125d and 210d, drones 130 and 365, and user devices 140, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105a and 105b, IoT-capable sensors 115a-115n, IoT-capable microwells 120a-120n, 205, and 335, microcontrollers 125a and 210a, sensors 125d and 210d, drones 130 and 365, and user devices 140, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi® device, a WiMax® device, a WWAN device, ZigBee® device, ZWave® device, LoRaWan® device, or cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
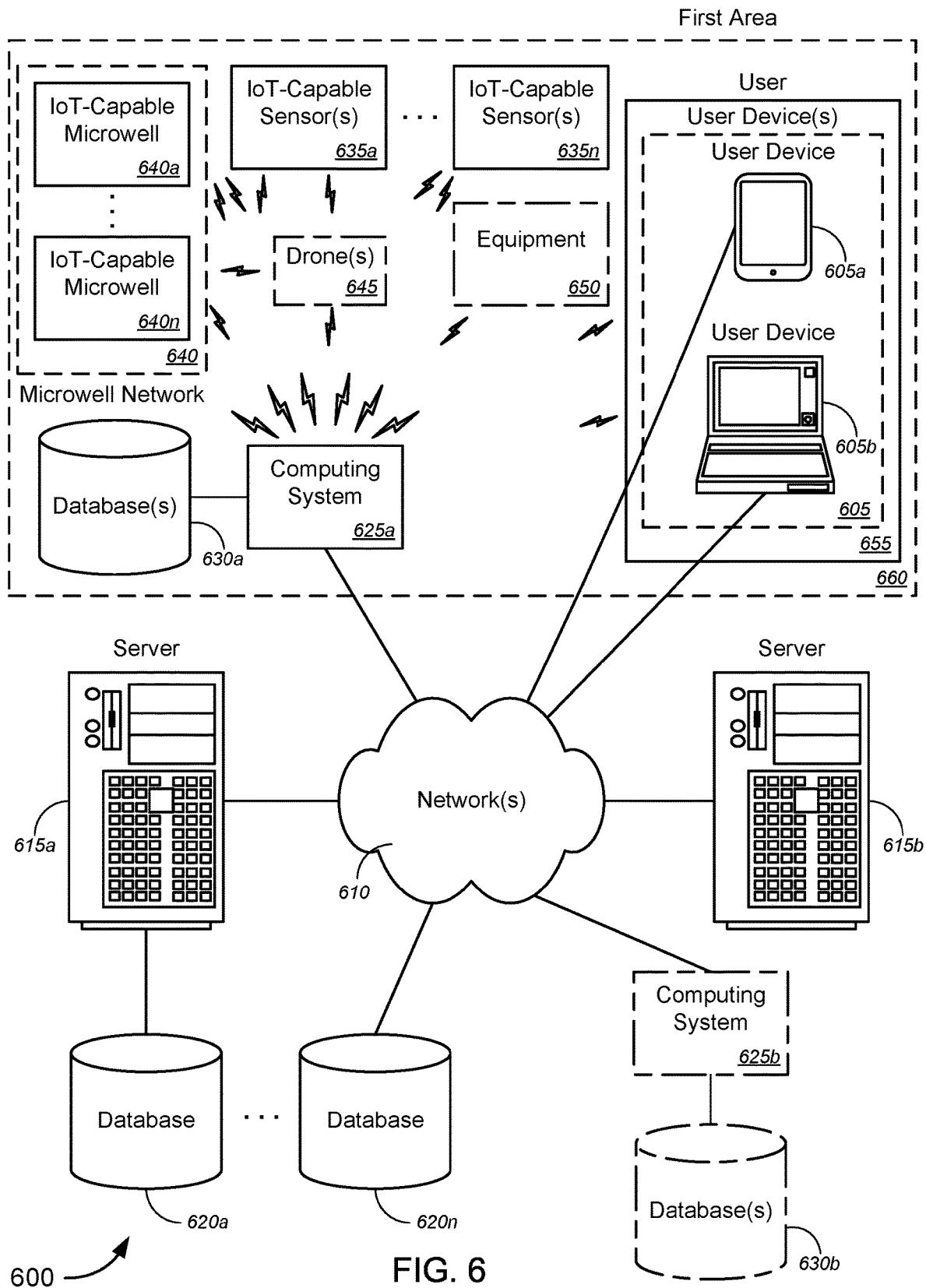
FIG. 6 is a block diagram illustrating a networked system of computers, computing systems, or system hardware architecture, which can be used in accordance with various embodiments.

As noted above, a set of embodiments comprises methods and systems for implementing Internet of Things ("IoT") functionality, and, more particularly, to methods, systems, and apparatuses for implementing IoT-based microwell solution for irrigation. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 610 (similar to network(s) 150 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing IoT functionality, and, more particularly, to methods, systems, and apparatuses for implementing IoT-based microwell solution for irrigation, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise computing system 625a and corresponding database(s) 630a (similar to computing system 105a and corresponding database(s) 110a of FIG. 1, or the like), one or more Internet of Things ("IoT")-capable sensors 635a-635n (collectively, "IoT-capable sensors 635" or the like; similar to IoT-capable sensors 115a-115n of FIG. 1, or the like), one or more IoT-capable microwells 640a-640n (collectively, "IoT-capable microwells 640" or the like; similar to IoT-capable microwells 120a-120n, 205, and 335 of FIGS. 1-3, or the like), one or more drones 645 (similar to drones 130 and 365 of FIGS. 1 and 3, or the like), equipment 650 (similar to equipment 135 of FIG. 1, or the like), and one or more remote computing system 625b and corresponding database(s) 630b (similar to computing system 105b and corresponding database(s) 110b of FIG. 1, or the like).

In operation, computing system 625a and/or 625b (collectively, "computing system" or the like) may receive, from the plurality of sensors (e.g., sensors 635a-635n, etc.), first sensor data, the first sensor data being indicative of environmental conditions within the first area (e.g., first area 660, etc.); may analyze the first sensor data to determine one or more first parameters associated with water requirements within the first area; and may generate a first water distribution plan for the first area based at least in part on the determined one or more first parameters. In some embodiments, the first sensor data may include, without limitation, at least one of humidity sensor data, soil moisture sensor data, ground water sensor data, water flow sensor data, clog sensor data, water pump sensor data, irrigation system sensor data, temperature sensor data, wind sensor data, weather sensor data, slope sensor data, topography sensor data, light sensor data, light intensity sensor data, image sensor data, video sensor data, object orientation sensor data, surface orientation sensor data, plant monitoring sensor data, motion sensor data, infrared sensor data, or pest detector data, and/or the like. In some cases, the one or more first parameters associated with water requirements may include, but are not limited to, at least one of humidity level, soil moisture level, water table depth, water table slope, water flow amount, water run-off characteristics, water evaporation rate, temperature, wind speed, wind direction, weather conditions, slope, topography, sun intensity level, orientation of objects, orientation of surfaces, plant color, plant size, plant shape, plant growth indicators, plant wilting indicators, or presence of pests, and/or the like.

The computing system may map the generated first water distribution plan for the first area to a positional map of the plurality of microwells (e.g., microwells 640, etc.) disposed in the corresponding plurality of pre-installed locations within the first area; may generate first command instructions for each microwell among the plurality of microwells to pump water from an underground water source and to irrigate a portion of the first area using the integrated irrigation system, based at least in part on the mapping of the generated first water distribution plan to the positional map of the plurality of microwells; and may send, via the transceiver, the generated first command instructions to each microwell among the plurality of microwells. In some instances, the first command instructions for each microwell may include, without limitation, instructions for at least one of direction of irrigation from said microwell, angle of water dispersion along the direction of irrigation, distance of irrigation from said microwell, amount of water to disperse from said microwell, rate of water dispersion from said microwell, or timing of irrigation for said microwell, and/or the like.

According to some embodiments, at least one microwell among the microwell network 640 each may send sensor data, from the one or more first sensors and via the wireless communications system, to the computing system, which is configured to control the plurality of microwells within the first area; may receive, from the computing system, the first command instructions; and may, in response to receiving the first command instructions, pump water from an underground water source using the pump and to actuate the integrated irrigation system to irrigate a portion of the first area around said microwell based on the first command instructions.

In some embodiments, the computing system may receive, from one or more second sensors (e.g., sensors 635a-635n, etc.), second sensor data, the second sensor data being indicative of environmental conditions within the first area prior to installation of the plurality of microwells within the first area; may analyze the second sensor data to determine one or more second parameters associated with water requirements within the first area; and may generate a second water distribution plan for the first area based at least in part on the determined one or more second parameters. The computing system may map the generated second water distribution plan for the first area to a geographical map of the first area; and may analyze the mapping of the generated second water distribution plan to the geographical map of the first area to determine placement of each of the plurality of microwells within the first area, wherein the determined placement corresponds to the plurality of pre-installed locations of the plurality of microwells. The computing system may generate the positional map of the plurality of microwells within the first area based on the determined placement of each of the plurality of microwells within the first area; and may send the generated positional map of the plurality of microwells within the first area to at least one of a user device (e.g., user device(s) 605, etc.) associated with a user 655 (e.g., a land-owner(s), an operator(s), and/or a service provider(s) providing the IoT network services, etc.) or a navigation system of a device (e.g., equipment 650, etc.) configured to install each microwell within the first area.

According to some embodiments, the one or more second sensors (e.g., sensors 635a-635n, etc.) may include a percolation test sensor, which may be used to measure a rate at which water percolates through a portion of soil in each of one or more locations throughout the first area. In some cases, the plurality of sensors may include at least one second sensor among the one or more second sensors, where the at least one second sensor comprises a third sensor, which may be disposed in an aerial drone (e.g., drone(s) 645, etc.) that is configured to fly over the first area to collect sensor data indicative of at least one of environmental conditions, topographical features, geographical features, plantable areas, water features, land features, plant-life, or wildlife within the first area, and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    receiving, using a computing system and from a plurality of sensors, first sensor data, the first sensor data being indicative of environmental conditions within a first area;
    analyzing, using the computing system, the first sensor data to determine one or more first parameters associated with water requirements within the first area;
    generating, using the computing system, a first water distribution plan for the first area based at least in part on the determined one or more first parameters;
    mapping, using the computing system, the generated first water distribution plan for the first area to a positional map of a plurality of microwells disposed in a corresponding plurality of pre-installed locations within the first area, each microwell comprising a pump, an integrated irrigation system, and a wireless communications system for communicating with the computing system via a transceiver;
    generating, using the computing system, first command instructions for each microwell among the plurality of microwells to pump water from an underground water source and to irrigate a portion of the first area using the integrated irrigation system, based at least in part on the mapping of the generated first water distribution plan to the positional map of the plurality of microwells, the first command instructions for each microwell comprising instructions for at least one of direction of irrigation from said microwell, angle of water dispersion along the direction of irrigation, distance of irrigation from said microwell, amount of water to disperse from said microwell, rate of water dispersion from said microwell, or timing of irrigation for said microwell;
    sending, using the computing system via the transceiver, the generated first command instructions to each microwell among the plurality of microwells;
    receiving, using the computing system and from one or more second sensors, second sensor data, the second sensor data being indicative of environmental conditions within the first area prior to installation of the plurality of microwells within the first area;
    analyzing, using the computing system, the second sensor data to determine one or more second parameters associated with water requirements within the first area;
    generating, using the computing system, a second water distribution plan for the first area based at least in part on the determined one or more second parameters;
    mapping, using the computing system, the generated second water distribution plan for the first area to a geographical map of the first area;
    analyzing, using the computing system, the mapping of the generated second water distribution plan to the geographical map of the first area to determine placement of each of the plurality of microwells within the first area, wherein the determined placement corresponds to the plurality of pre-installed locations of the plurality of microwells;
    generating, using the computing system, the positional map of the plurality of microwells within the first area based on the determined placement of each of the plurality of microwells within the first area; and
    sending, using the computing system, the generated positional map of the plurality of microwells within the first area to at least one of a user device associated with a user or a navigation system of a device configured to install each microwell within the first area.

2. The method of claim 1, wherein the computing system comprises at least one of a farm management computing system, a crop management computing system, a lawn management computing system, an irrigation control system, a microwell control system, a server computer, a cloud computing system, or a distributed computing system.

3. The method of claim 1, wherein the first sensor data comprises at least one of humidity sensor data, soil moisture sensor data, ground water sensor data, water flow sensor data, clog sensor data, water pump sensor data, irrigation system sensor data, temperature sensor data, wind sensor data, weather sensor data, slope sensor data, topography sensor data, light sensor data, light intensity sensor data, image sensor data, video sensor data, object orientation sensor data, surface orientation sensor data, plant monitoring sensor data, motion sensor data, infrared sensor data, or pest detector data.

4. The method of claim 1, wherein the first area comprises at least one of an agricultural field, a farm, a plot of land, a crop field, a sod farm, a residential lawn, a commercial lawn, a residential garden, or a commercial garden.

5. The method of claim 1, wherein the one or more first parameters associated with water requirements comprise at least one of humidity level, soil moisture level, water table depth, water table slope, water flow amount, water run-off characteristics, water evaporation rate, temperature, wind speed, wind direction, weather conditions, slope, topography, sun intensity level, orientation of objects, orientation of surfaces, plant color, plant size, plant shape, plant growth indicators, plant wilting indicators, or presence of pests.

6. The method of claim 1, wherein at least one microwell is fluidly coupled to an adjacent microwell among the plurality of microwells via a fluid pipe and via fluid connections between a well cap of one fluidly coupled microwell and a well cap of another fluidly coupled microwell to form a network of connected microwells, wherein the fluid pipe is configured to transport first fluids between the fluidly coupled microwells using at least one transport pump disposed at one or more fluidly coupled microwells, wherein the first fluids comprise at least one of water, fertilizer in a fluid medium, plant growth enhancers in a fluid medium, or insecticide in a fluid medium.

7. The method of claim 6, wherein the network of connected microwells fluidly couple with a combination of one or more underground water sources and one or more surface water sources, wherein the network of connected microwells is fluidly coupled with each underground water source via one of the plurality of microwells, wherein the network of connected microwells is fluidly coupled with each surface water source via at least one surface water pump in fluid communication with each surface water source and via a corresponding fluid pipe in fluid communication with at least one microwell in the network of connected microwells.

8. The method of claim 1, wherein the one or more second sensors comprise a percolation test sensor, wherein the percolation test sensor is used to measure a rate at which water percolates through a portion of soil in each of one or more locations throughout the first area.

9. The method of claim 1, wherein the plurality of sensors comprises at least one second sensor among the one or more second sensors, wherein the at least one second sensor comprises a third sensor, wherein the third sensor is disposed in an aerial drone that is configured to fly over the first area to collect sensor data indicative of at least one of environmental conditions, topographical features, geographical features, plantable areas, water features, land features, plant-life, or wildlife within the first area.

10. The method of claim 1, wherein the computing system autonomously communicates with each microwell among the plurality of microwells and with each of the plurality of sensors using Internet of Things ("IoT")-based communications protocols.

11. A system, comprising:
a plurality of sensors;
a plurality of microwells disposed in a corresponding plurality of pre-installed locations within a first area, each microwell comprising a pump, an integrated irrigation system, and a wireless communications system for communicating with a computing system via a transceiver; and
the computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive, from the plurality of sensors, first sensor data, the first sensor data being indicative of environmental conditions within the first area;
analyze the first sensor data to determine one or more first parameters associated with water requirements within the first area;
generate a first water distribution plan for the first area based at least in part on the determined one or more first parameters;
map the generated first water distribution plan for the first area to a positional map of the plurality of microwells disposed in the corresponding plurality of pre-installed locations within the first area;
generate first command instructions for each microwell among the plurality of microwells to pump water from an underground water source and to irrigate a portion of the first area using the integrated irrigation system, based at least in part on the mapping of the generated first water distribution plan to the positional map of the plurality of microwells, the first command instructions for each microwell comprising instructions for at least one of direction of irrigation from said microwell, angle of water dispersion along the direction of irrigation, distance of irrigation from said microwell, amount of water to disperse from said microwell, rate of water dispersion from said microwell, or timing of irrigation for said microwell;
send, via the transceiver, the generated first command instructions to each microwell among the plurality of microwells;
receive, from one or more second sensors, second sensor data, the second sensor data being indicative of environmental conditions within the first area prior to installation of the plurality of microwells within the first area;
analyze the second sensor data to determine one or more second parameters associated with water requirements within the first area;
generate a second water distribution plan for the first area based at least in part on the determined one or more second parameters;
mapping the generated second water distribution plan for the first area to a geographical map of the first area;
analyzing the mapping of the generated second water distribution plan to the geographical map of the first area to determine placement of each of the plurality of microwells within the first area, wherein the determined placement corresponds to the plurality of pre-installed locations of the plurality of microwells;

generating the positional map of the plurality of microwells within the first area based on the determined placement of each of the plurality of microwells within the first area; and sending the generated positional map of the plurality of microwells within the first area to at least one of a user device associated with a user or a navigation system of a device configured to install each microwell within the first area.

12. The system of claim 11, wherein the computing system comprises at least one of a farm management computing system, a crop management computing system, a lawn management computing system, an irrigation control system, a microwell control system, a server computer, a cloud computing system, or a distributed computing system.

13. The system of claim 11, wherein the computing system autonomously communicates with each microwell among the plurality of microwells and with each of the plurality of sensors using Internet of Things ("IoT")-based communications protocols.

\* \* \* \* \*